United States Patent
Lemaire et al.

(10) Patent No.: US 11,312,214 B2
(45) Date of Patent: Apr. 26, 2022

(54) VEHICLE CONTAINER, VEHICLE CONTAINER DOOR AND SYSTEM FOR ASSEMBLING A DOOR TO A VEHICLE CONTAINER

(71) Applicant: INDUSTRIES FABKOR INC., Saint-Gabriel-de-Brandon (CA)

(72) Inventors: Benoit Lemaire, St-Jean-de-Matha (CA); Stefane Leib, Saint-Charles-Borommee (CA); Dominic Giroux-Bernier, St-Gabriel-de-Brandon (CA)

(73) Assignee: INDUSTRIES FABKOR INC., Saint-Gabriel-de-Brandon (CA)

( * ) Notice: Subject to any disclaimer, the term of this patent is extended or adjusted under 35 U.S.C. 154(b) by 0 days.

(21) Appl. No.: 17/435,667

(22) PCT Filed: Feb. 28, 2020

(86) PCT No.: PCT/IB2020/051732
§ 371 (c)(1),
(2) Date: Sep. 1, 2021

(87) PCT Pub. No.: WO2020/178697
PCT Pub. Date: Sep. 10, 2020

(65) Prior Publication Data
US 2022/0041041 A1    Feb. 10, 2022

Related U.S. Application Data

(60) Provisional application No. 62/812,675, filed on Mar. 1, 2019.

(51) Int. Cl.
*B60J 5/10* (2006.01)
*B62D 33/03* (2006.01)
(Continued)

(52) U.S. Cl.
CPC ............ *B60J 5/108* (2013.01); *B62D 33/037* (2013.01); *B60P 1/273* (2013.01)

(58) Field of Classification Search
CPC ......... B60J 5/108; B62D 33/037; B60P 1/273
See application file for complete search history.

(56) References Cited

U.S. PATENT DOCUMENTS 3,656,801 A    4/1972  Doutt et al.
4,468,065 A    8/1984  Taniguchi
(Continued)

FOREIGN PATENT DOCUMENTS

CN    206690959    12/2017

OTHER PUBLICATIONS

International Search Report from PCT/IB2020/051732, Sorin Muntean, May 21, 2020.
(Continued)

*Primary Examiner* — D Glenn Dayoan
*Assistant Examiner* — Melissa Ann Bonifazi
(74) *Attorney, Agent, or Firm* — BCF LLP

(57) ABSTRACT

A system for assembling a door to a vehicle container having first and second pillars includes a first base adapted for connection to a top portion of the first pillar, a second base adapted for connection to a top portion of the second pillar, and a hinge assembly adapted for pivotally connecting the door to the vehicle container. The hinge assembly is adapted to be removably connected to the first and second bases and to the door. The hinge assembly is selected from first and second hinge assemblies. When the first hinge assembly pivotally connects the door to the vehicle container, the door has a first pivoting configuration. When the second hinge assembly pivotally connects the door to the vehicle container, the door has a second pivoting configuration being different from the first pivoting configuration. A vehicle
(Continued)

container and a door for a vehicle container are also encompassed.

25 Claims, 15 Drawing Sheets

(51) Int. Cl.
  *B62D 33/037* (2006.01)
  *B60P 1/273* (2006.01)

(56) References Cited

U.S. PATENT DOCUMENTS

| | | |
|---|---|---|
| 5,143,496 A | 9/1992 | Smith |
| 5,158,340 A | 10/1992 | Boda |
| 6,015,191 A | 1/2000 | Bontrager |
| 6,764,130 B1 | 7/2004 | Hull |
| 6,779,825 B1 | 8/2004 | Greenert et al. |
| 6,880,895 B1 | 4/2005 | Brown et al. |
| 7,165,800 B2 | 1/2007 | Thiele et al. |
| 8,028,938 B2 | 10/2011 | Truan et al. |
| 8,246,098 B2 | 8/2012 | Cheung et al. |
| 8,414,083 B2 | 4/2013 | Dunker |
| 8,740,279 B1 | 6/2014 | McGoff et al. |
| 8,944,484 B2 | 2/2015 | Kilber et al. |
| 11,173,822 B2 * | 11/2021 | Shoopman .............. E05B 83/02 |
| 2011/0025117 A1 | 2/2011 | Williams, III |
| 2012/0061987 A1 * | 3/2012 | Fraley ................ B62D 33/0273 |
| | | 296/51 |
| 2012/0324793 A1 | 12/2012 | Abbasi et al. |

OTHER PUBLICATIONS

English translation of abstract of CN206690959 retrieved from espacenet on May 26, 2020.

* cited by examiner

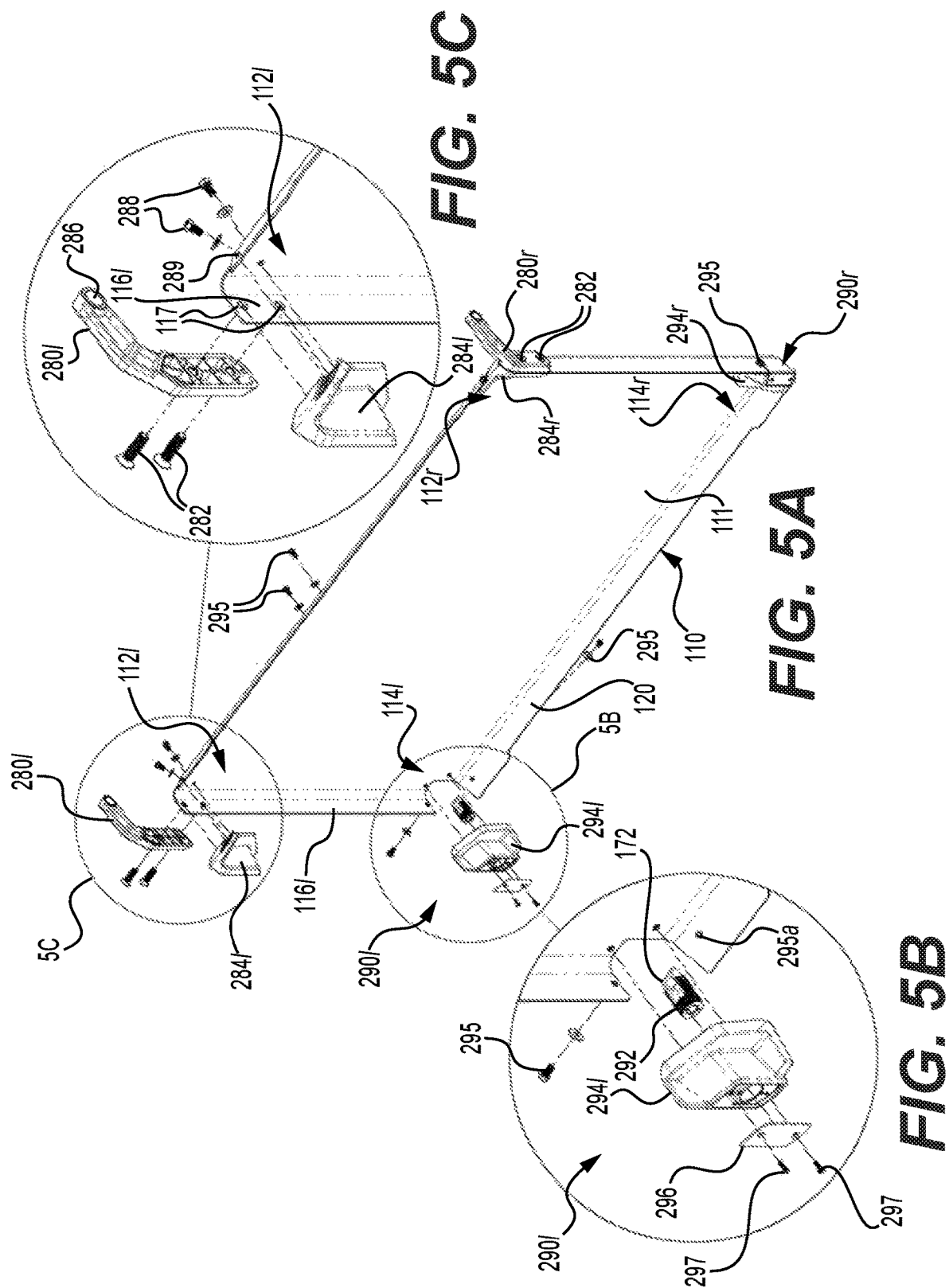

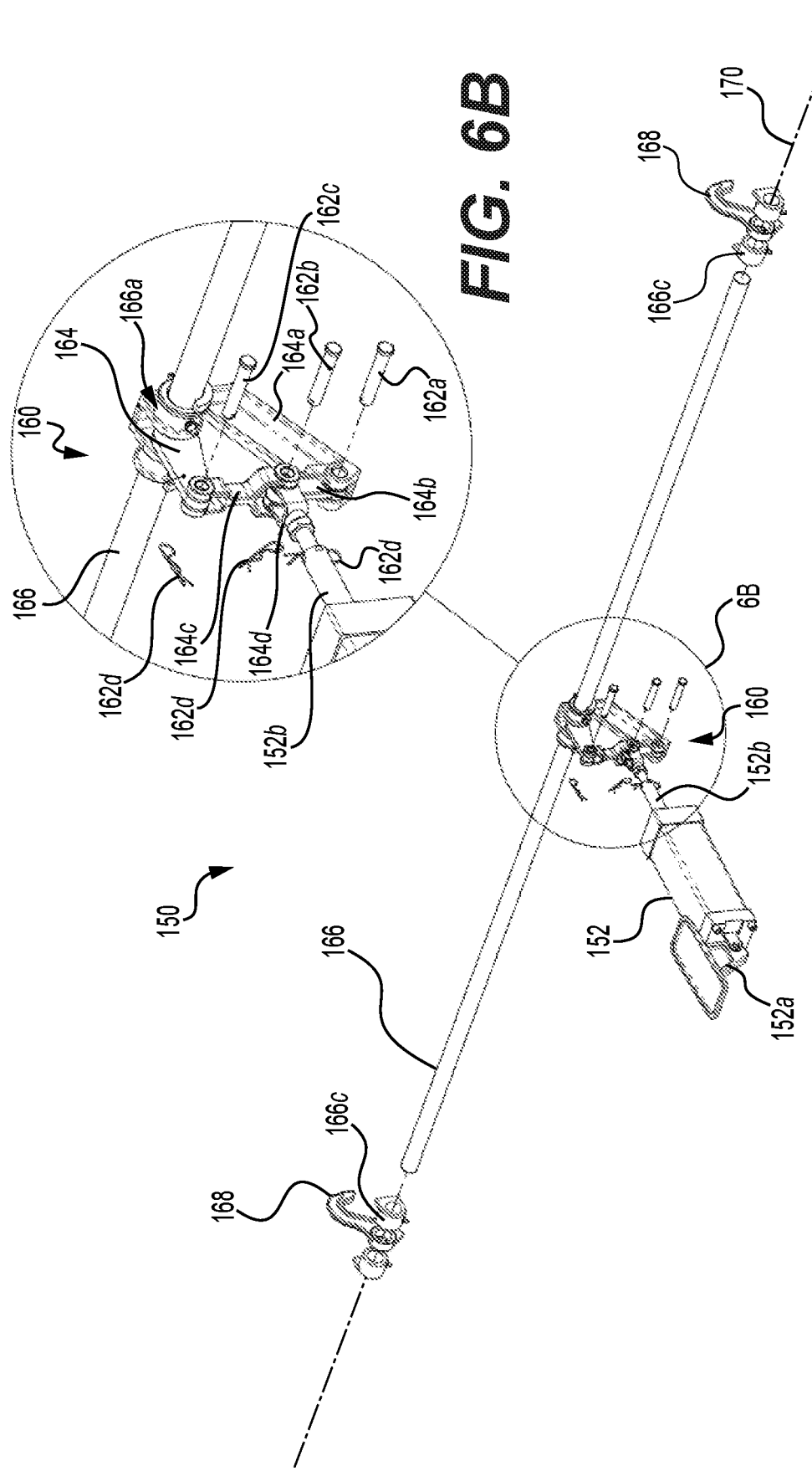

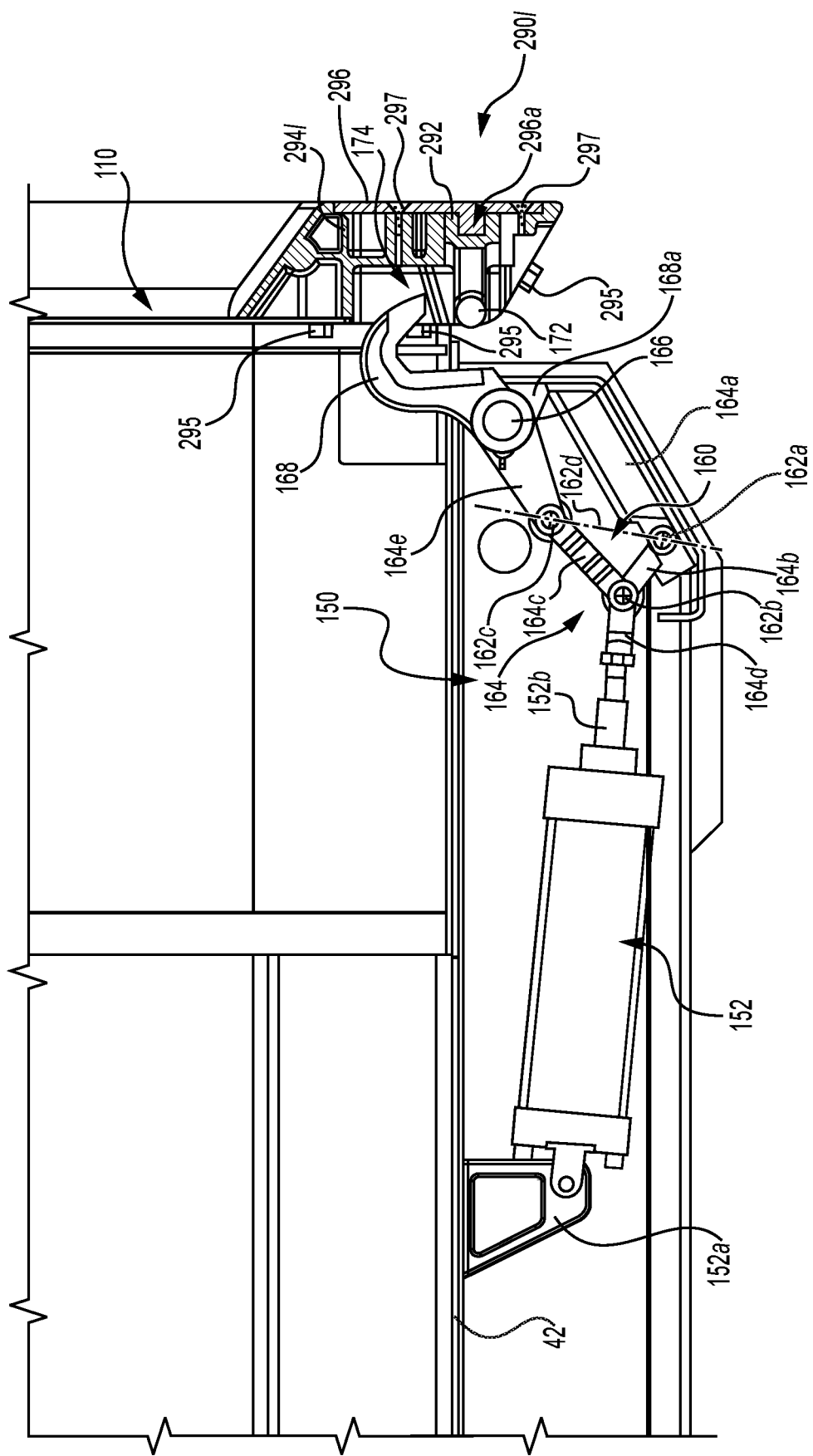

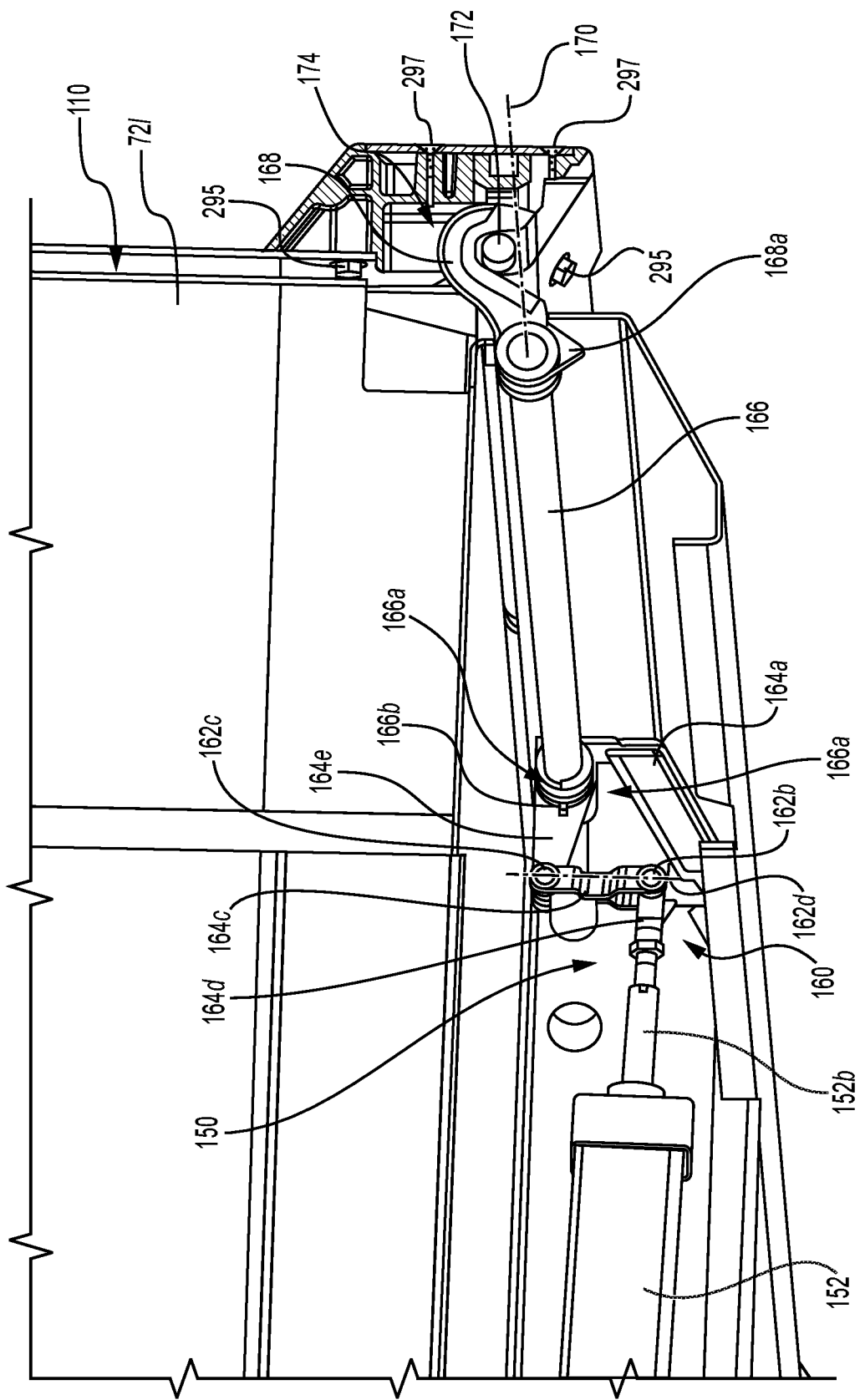

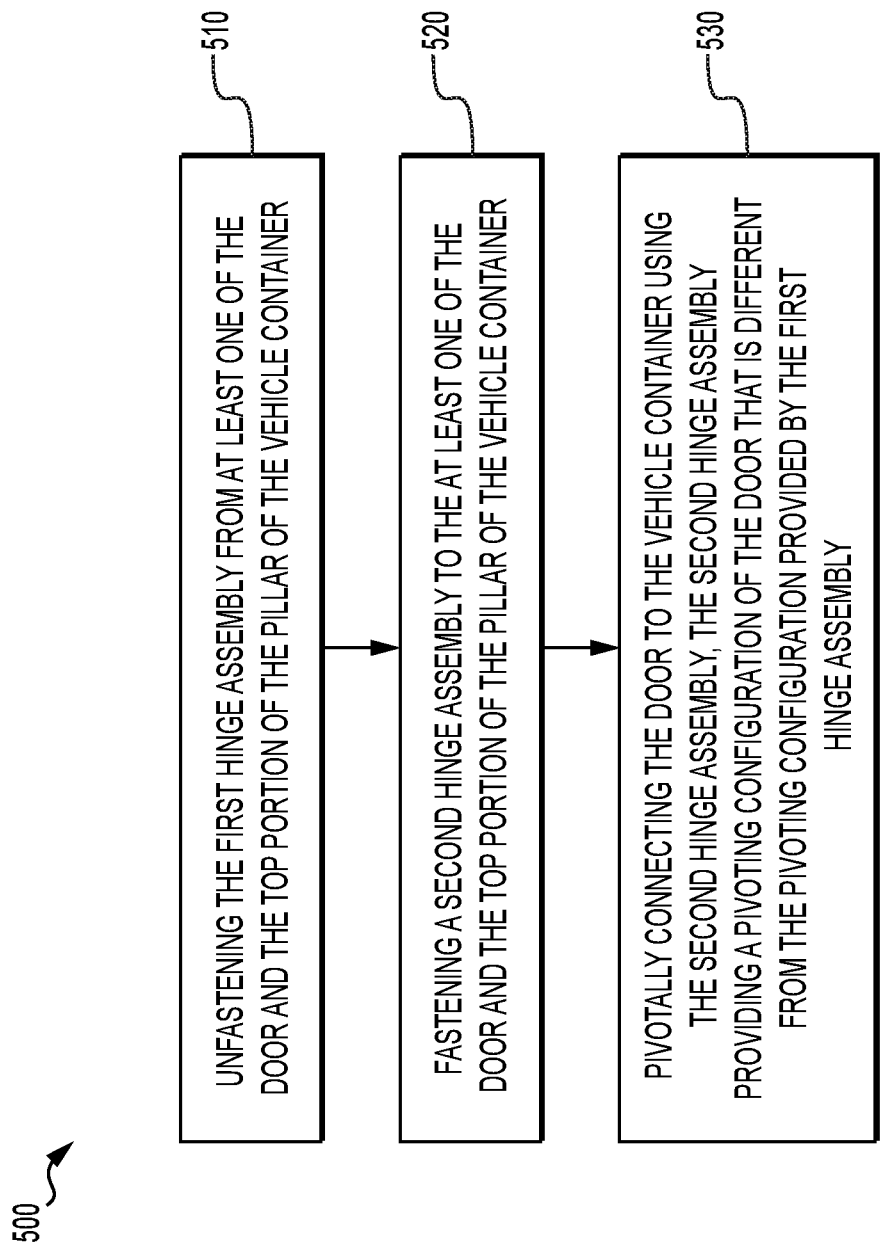

VEHICLE CONTAINER, VEHICLE CONTAINER DOOR AND SYSTEM FOR ASSEMBLING A DOOR TO A VEHICLE CONTAINER

CROSS-REFERENCE TO RELATED APPLICATION

The present application claims priority to U.S. Provisional Patent Application Ser. No. 62/812,675, filed Mar. 1, 2019, entitled "Vehicle Container and Vehicle Container Door", which is incorporated by reference herein in its entirety.

FIELD OF TECHNOLOGY

The present technology relates to vehicle containers, vehicle container doors, and to systems for assembling a door to a vehicle container.

BACKGROUND

Many vehicles, such as trucks, including pick-up trucks, and trailers are provided with a container for the transport of their cargo, whether it is bulk materials or else. Such vehicle containers exist in different type, size and shape and generally have a door assembly to access their content. The door assembly includes a door that is, in many cases, pivotally connected to the vehicle container.

One example of such a vehicle container is a dump body for a truck. Dump bodies are used for the transport of different materials, such as rocks, soil, sand, snow and the like. These dump bodies typically have a container that has an open top, and are typically pivotable relative to the chassis of the truck to allow for their content to be emptied. A dump body has a door assembly including a door that is pivotally connected to the dump body to contain the materials therein. The door, also known as a tailgate plate, is selectively opened to empty the content of the dump body. Door assemblies can have different opening configurations in a dump body, such as single-action opening, high-lift gate opening and swing-gate opening. These different pivoting configurations require different types of hinge assemblies for pivotally connecting the door to the dump body.

In various vehicle containers, such as in dump bodies, the hinge assemblies typically have components welded to the vehicle container and to the door so as to provide for a sturdy connection of the door assembly to the vehicle container. However, welding the components of the hinge assemblies to the vehicle container and the door presents assembly challenges, notably due to possible alignment and fit issues between the door and the container. Moreover, welding the components of the hinge assemblies to the vehicle container and the door also presents the drawback that the hinge assemblies are permanently connected to the vehicle container and to the door, which prevents convenient changing of the pivoting configuration of the door using a different hinge assembly. There is therefore a desire for improvements in the way the door assemblies are pivotally connected to vehicle containers.

In various vehicle containers, such as in dump bodies, the fit between the door and the container is difficult to adjust. Adjustment systems exist, but they are typically located in hard to reach locations on the vehicle container, which makes adjusting the fit of the door to the vehicle container challenging. There is therefore a desire for improvements in the way the position of a door can be adjusted relative to the vehicle container to which it is connected.

Furthermore, in various vehicle containers, the door can be locked in a closed position using a door latch system. Some door latch systems use hooks selectively engaging the door for locking and unlocking the door to the vehicle container. The hooks are movable between the locked and unlocked position using one or more actuators. Door latch systems are exposed to debris and dust which may affect their operation, and in some circumstances, may cause the hooks to not adequately move between the locked and unlocked position. There is therefore a desire for improvements in the way door latch systems are positioned and integrated to vehicle containers to improve their reliability.

SUMMARY

It is an object of the present technology to ameliorate at least some of the inconveniences present in the prior art.

In some circumstances, the present technology facilitates the assembly of a door to a vehicle container compared to conventional assembly systems and methods. The present technology provides that the door is removably connected to the vehicle container using hinge assemblies that are fastened to both the door and the vehicle container. By using fastened connections, some of the issues and drawbacks of conventional assembly systems and methods that used welded connections are avoided. For example, the issues related to the stresses, deformations and warpage induced by the welding of the hinge assemblies to the door are avoided. Using the present technology, the door has a better fit relative to the vehicle container, which leads to shorter assembly times. Under some circumstances and as will be described below, the present technology also enables the door to be lighter and have an increased service life compared to conventional doors having components welded thereto.

Having the hinge assemblies fastened to both the door and the vehicle container also provides a user with flexibility for selecting the pivoting configuration of the door relative to the vehicle container. In contrast with a hinge assembly that is welded to both the door and the vehicle container, the hinge assemblies of the present technology are removably connected to the door and to the vehicle container. If needed, a user can unfasten a first hinge assembly from the door and/or vehicle container and change the pivoting configuration of the door relative to the vehicle container from a first configuration to a second configuration by fastening a second hinge assembly to the door and to the vehicle container, the second hinge assembly providing a pivoting configuration of the door that is different from the pivoting configuration provided by the first hinge assembly.

Another aspect of the present technology relates to a vehicle container having a door pivotally connected to a vehicle container body via hinge assemblies that are fastened to the door and the vehicle container body. In contrast with conventional vehicle containers where the hinge assembly is welded to both the vehicle container body and the door, the present technology uses fastened connections and thus avoid the drawbacks caused by welding, such as heat-related stresses, deformations and warping in the door. In some embodiments, the door of the present technology has several advantages over conventional doors, such as a reduced mass, longer service life, no need to inspect and/or repair welds, and a better fit to the vehicle container body.

Yet another aspect of the present technology relates to a vehicle container having a door pivotally connected thereto and door latch system for locking the door in a closed position. The door latch system includes an extendible and retractable actuator pivotally connected to the vehicle container body, a linkage assembly operatively connected to the actuator, a rod operatively connected to the linkage assembly, the rod being pivotable about an axis upon extension and retraction of the actuator. The door latch system further includes at least one hook connected to the rod, the at least one hook being received and withdrawn from the at least one recess of the door by pivoting the rod about the axis, and at least one pin removably fastened to the door, the at least one pin being movable relative to the door. By having the at least one pin fastened to the door and moveable relative to the door, adjustment of the door latch system is facilitated compared to conventional door latch systems. In some embodiments, the at least one pin is conveniently accessible for a rear side of the vehicle container, and is movable relative to the door by screwing or unscrewing an adjustment screw. There is thus no need for adjusting the position of the axis about which the rod pivots using an eccentric assembly, which is typically difficult to access and adjust. Moreover, using the door latch system of the present technology in combination with hinge assemblies fastened to the door and the vehicle container permits the adjustment of the position of the door relative to the vehicle container in a heightwise direction.

These features and additional features of the present technology will be described in more details below.

According to one aspect of the present technology, there is provided a system for assembling a door to a vehicle container. The vehicle container has a container body, a first pillar connected to the container body, and a second pillar connected to the container body. The vehicle container has an opening providing access to an interior of the container body. The opening is defined between the first and second pillars, and the door selectively closes the opening. The system includes a first base adapted for connection to a top portion of the first pillar, a second base adapted for connection to a top portion of the second pillar, and a hinge assembly adapted for pivotally connecting the door to the vehicle container. The hinge assembly is adapted to be removably connected to the first and second bases and to the door. The hinge assembly is selected from a first hinge assembly, and a second hinge assembly. When the first hinge assembly pivotally connects the door to the vehicle container, the door has a first pivoting configuration and when the second hinge assembly pivotally connects the door to the vehicle container, the door has a second pivoting configuration being different from the first pivoting configuration.

In some embodiments, the first hinge assembly includes a first left hinge assembly having a first left adapter assembly adapted to be removably connected to the first base, a first left pillar bracket adapted to be removably connected to the first left adapter assembly, and a first left door bracket adapted to be removably connected to the door. The first hinge assembly further has a first right hinge assembly having a first right adapter assembly adapted to be removably connected to the second base, a first right pillar bracket adapted to be removably connected to the first right adapter assembly, and a first right door bracket adapted to be removably connected to the door. The second hinge assembly includes a second left hinge assembly having a second left adapter assembly adapted to be removably connected to the first base, a second left pillar bracket adapted to be removably connected to the second left adapter assembly, and a second left door bracket adapted to be removably connected to the door. The second hinge assembly further has a second right hinge assembly having a second right adapter assembly adapted to be removably connected to the second base, a second right pillar bracket adapted to be removably connected to the second right adapter assembly, and a second right door bracket adapted to be removably connected to the door. The first left pillar bracket is identical to the second left pillar bracket, and the first right pillar bracket is identical to the second right pillar bracket.

In some embodiments, the first left pillar bracket is identical to the first right pillar bracket.

In some embodiments, the first left adapter assembly is identical to the first right adapter assembly, and the second left adapter assembly is identical to the second right adapter assembly.

In some embodiments, éthe first left door bracket is identical to the second left door bracket, and the first right door bracket is identical to the second right door bracket.

In some embodiments, when in use, the first left pillar bracket and the second left pillar bracket are located at different positions relative to the first base, and, when in use, the first right pillar bracket and the second right pillar bracket are located at different positions relative to the second base.

In some embodiments, the first hinge assembly is a single-action opening hinge assembly. The first left door bracket is pivotally connected to the first left pillar bracket, and the first right door bracket is pivotally connected to the first right pillar bracket.

In some embodiments, the second hinge assembly is a high-lift gate opening hinge assembly further including a left extension arm pivotally connected between the second left door bracket and the second left pillar bracket, a right extension arm pivotally connected between the second right door bracket and the second right pillar bracket, and at least one actuator assembly having upper and lower ends. The lower end is pivotally connected to one of the first and second pillars. The upper end is pivotally connected to one of the left and right extension arms. The actuator assembly includes an extendible and retractable actuator being operable for pivoting the door away from the first and second pillars when moved to an extended position, and pivoting the door towards the first and second pillars when moved to a retracted position.

In some embodiments, the hinge assembly is selected from the first hinge assembly, the second hinge assembly and a third hinge assembly providing for a third pivoting configuration of the door relative to the vehicle container, the third pivoting configuration being different from the first and second pivoting configurations. The third hinge assembly includes a third left hinge assembly having a third left adapter assembly adapted to be removably connected to the first base, a third left pillar bracket adapted to be removably connected to the third left adapter assembly, and a third left door bracket adapted to be removably connected to the door. The third hinge assembly further has a third right hinge assembly having a third right adapter assembly adapted to be removably connected to the second base, a third right pillar bracket adapted to be removably connected to the third right adapter assembly, and a third right door bracket adapted to be removably connected to the door. The third left pillar bracket is different from the third right pillar bracket, and the third left door bracket is different from the third right door bracket.

In some embodiments, the third hinge assembly is a swing-gate opening hinge assembly. The third left pillar bracket is an upper left pillar bracket. The third right pillar bracket is an upper right pillar bracket. The third left door bracket is an upper left door bracket. The third right door bracket is an upper right door bracket. The third hinge assembly further includes at least one of a lower left pillar bracket adapted to be removably connected to the first pillar below the upper left pillar bracket, and a lower right pillar bracket adapted to be removably connected to the second pillar below the upper right pillar bracket. The door is pivotally connected to the vehicle container via at least one of the upper left pillar bracket and the lower left pillar bracket, and the upper right pillar bracket and the lower right pillar bracket.

In some embodiments, when in use, any one of the first, second and third left adapter assemblies defines at least partially a top face of the first pillar, and, when in use, any one of the first, second and third right adapter assemblies defines at least partially a top face of the second pillar.

In some embodiments, the system further includes a left adjuster assembly for adjusting a position of any one of the first, second and third left pillar bracket relative to the corresponding first, second or third left adapter assembly, and a right adjuster assembly for adjusting a position of any one of the first, second and third right pillar bracket relative to the corresponding first, second or third right adapter assembly.

In some embodiments, the left adjuster assembly adjusts the position of any one of the first, second and third left pillar bracket relative to the corresponding first, second or third left adapter assembly in a lengthwise direction of the vehicle container, and the right adjuster assembly adjusts a position of any one of the first, second and third right pillar bracket relative to the corresponding first, second or third right adapter assembly in the lengthwise direction of the vehicle container.

In some embodiments, the system further includes at least one adjustment screw assembly connected to the door for adjusting a position of the door relative to the vehicle container.

In some embodiments, the first base is a left base, the first pillar is a left pillar, the second base is a right base, the second pillar is a right pillar, and the container body includes a floor, a front wall connected to a front end of the floor and extending upwardly from the floor, a left side wall connected to the floor and the front wall. The left side wall extends upwardly from a left side of the floor and rearward of the front wall. The left pillar is connected to the left side wall and to a rear end of the floor. The left pillar extends upwardly from the rear end of the floor and rearward of the left side wall. The container body further includes a right side wall connected to the floor and the front wall, the right side wall extending upwardly from a right side of the floor and rearward of the front wall, the right pillar being connected to the right side wall and to the rear end of the floor, the right pillar extending upwardly from the rear end of the floor and rearward of the right side wall.

In some embodiments, the vehicle container is a dump body for a truck.

In some embodiments, the door is a tailgate plate.

According to another aspect if the present technology, there is provided a system for assembling a family of vehicle containers. The system includes a vehicle container having a container body, a first pillar connected to the container body, a first base connected to a top portion of the first pillar, a second pillar connected to the container body, and a second base connected to a top portion of the second pillar. The system further includes a door assembly for selectively closing an opening defined between the first and second pillars, the opening providing access to an interior of the vehicle container. The door assembly including a door. The system further includes a hinge assembly adapted for pivotally connecting the door to the vehicle container, the hinge assembly being adapted to be removably connected to the first and second bases and to the door. The hinge assembly is selected from a first hinge assembly, and a second hinge assembly. When the first hinge assembly pivotally connects the door to the vehicle container, the door has a first pivoting configuration and when the second hinge assembly pivotally connects the door to the vehicle container, the door has a second pivoting configuration being different from the first pivoting configuration.

There is also provided a vehicle container assembled according to the system described above.

There is also provided a truck having a frame, a cab connected to the frame, a plurality of wheels rotatably connected to the frame, and the vehicle container described above connected to the frame.

According to yet another aspect of the present technology, there is provided a method for changing a pivoting configuration of a door pivotally connected to a top portion of a pillar of a vehicle container via a first hinge assembly. The method involves unfastening the first hinge assembly from at least one of the door and the top portion of the pillar of the vehicle container, fastening a second hinge assembly to the at least one of the door and the top portion of the pillar of the vehicle container, and pivotally connecting the door to the vehicle container using the second hinge assembly, the second hinge assembly providing a pivoting configuration of the door that is different from the pivoting configuration provided by the first hinge assembly.

According to yet another aspect of the present technology, there is provided a door for a vehicle container. The door includes a panel having left and right bent portions, and a lower bent portion. The panel defines holes in the left and right bent portions and in the lower bent portion for receiving fasteners. The door further includes a portion of a hinge assembly removably connected to the panel by the fasteners.

In some embodiments, the portion of a hinge assembly includes at least one of a left lower bracket removably fastened to the left bent portion and to the lower bent portion, and a right lower bracket removably fastened to the right bent portion and to the lower bent portion.

In some embodiments, the at least one of the left lower bracket and the right lower bracket includes an adjustment screw assembly for adjusting a position of the door relative to the vehicle container.

In some embodiments, the panel further comprises an upper bent portion, and the portion of a hinge assembly further includes a left upper bracket removably fastened to the left bent portion and to the upper bent portion, and a right upper bracket removably fastened to the right bent portion and to the upper bent portion.

According to yet another aspect of the present technology, there is provided a vehicle container including a vehicle container body, a door pivotally connected the vehicle container body, and a screw adjustment assembly removably connected to the door for adjusting a position of the door relative to the vehicle container body.

In some embodiments, the vehicle container further has a door latch system for locking the door to the vehicle container body when the door is in a closed position. the door latch system includes an extendible and retractable actuator pivotally connected to the vehicle container body, a linkage assembly operatively connected to the actuator, a rod operatively connected to the linkage assembly, the rod being pivotable about an axis upon extension and retraction of the actuator, and a hook connected to the rod, the hook being moved between a locked position and an unlocked position by pivoting the rod about the axis, and the screw adjustment assembly includes a pin removably fastened to the door, the pin being movable relative to the door and catchable by the hook.

In some embodiments, the pin is threadably connected to the door.

In some embodiments, the screw adjustment assembly includes an adjustment screw connected to the pin, and a cap, the cap having a projection for preventing a rotation of the adjustment screw.

In some embodiments, the hook has a tapered shape.

In some embodiments, the screw adjustment assembly cooperates with the hook to adjust the position of the door relative to the vehicle container body in a heightwise direction.

In some embodiments, the screw adjustment assembly is accessible from a rear side of the door.

In some embodiments, the screw adjustment assembly adjusts the position of the door relative to the vehicle container in a lengthwise direction.

According to yet another aspect of the present technology, there is provided a vehicle container including a vehicle container body defining an opening, a door pivotally connected to the vehicle container body and selectively closing the opening when pivoted in a closed position, the door defining at least one recess, and a door latch system for locking the door to the vehicle container body in the closed position. The door latch system includes an extendible and retractable actuator pivotally connected to the vehicle container body, a linkage assembly operatively connected to the actuator, a rod operatively connected to the linkage assembly, the rod being pivotable about an axis upon extension and retraction of the actuator, at least one hook connected to the rod, the at least one hook being received and withdrawn from the at least one recess of the door by pivoting the rod about the axis, and at least one pin removably fastened to the door and extending in the at least one recess, the at least one pin being selectively movable relative to the door.

In some embodiments, the at least one pin is threadably connected to the door.

In some embodiments, the linkage assembly includes a base connected to the vehicle container body, a first link pivotally connected to the base by a first pivot axis, a second link pivotally connected to the first link by a second pivot axis, and a rod link pivotally connected to the second link by a third pivot axis, and the rod link being further connected to the rod.

In some embodiments, when the at least one hook is in an unlocked position, the second pivot axis is on a first side of an imaginary line passing through the first and third pivot axes, and when the at least one hook is in a locked position, the second pivot axis is on a second side of the imaginary line, the second side being opposite the first side. The over-center configuration of the linkage assembly clamps the door latch system in the locked position.

In some embodiments, the at least one hook has a tapered shape.

In some embodiments, the vehicle container further includes a stop connected to the at least one hook, the stop being structured to abut the vehicle container body when the at least one hook is fully withdrawn from the at least one recess of the door.

For purposes of the present application, terms related to spatial orientation such as front, rear, left and right should be understood as they would normally be understood by a driver of a truck having a vehicle container sitting in the truck in a normal driving position with the vehicle container in a lowered position.

Embodiments of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of embodiments of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where:

FIG. 5A is a partly exploded, perspective view taken from a top, rear, right side of the door of FIG. 2, with left and right door brackets and left and right adjustment screw assemblies connected thereto;

FIG. 5B is an enlarged view of portion 5B of FIG. 5A;

FIG. 5C is an enlarged view of portion 5C of FIG. 5A;

FIG. 6A is a partly exploded, perspective view taken from a top, front, left side of a door latch system of the vehicle container of FIG. 1;

FIG. 6B is an enlarged view of portion 6B of FIG. 6A;

FIG. 6C is a left side elevation view of the door latch system of FIG. 6A, with the door and the vehicle container of FIG. 2, with the left side wall of the vehicle container removed and the door latch system in an unlocked position;

FIG. 6F is a perspective view taken from a front, left side of the door latch system, door and vehicle container of FIG. 6E;

Figure 9:
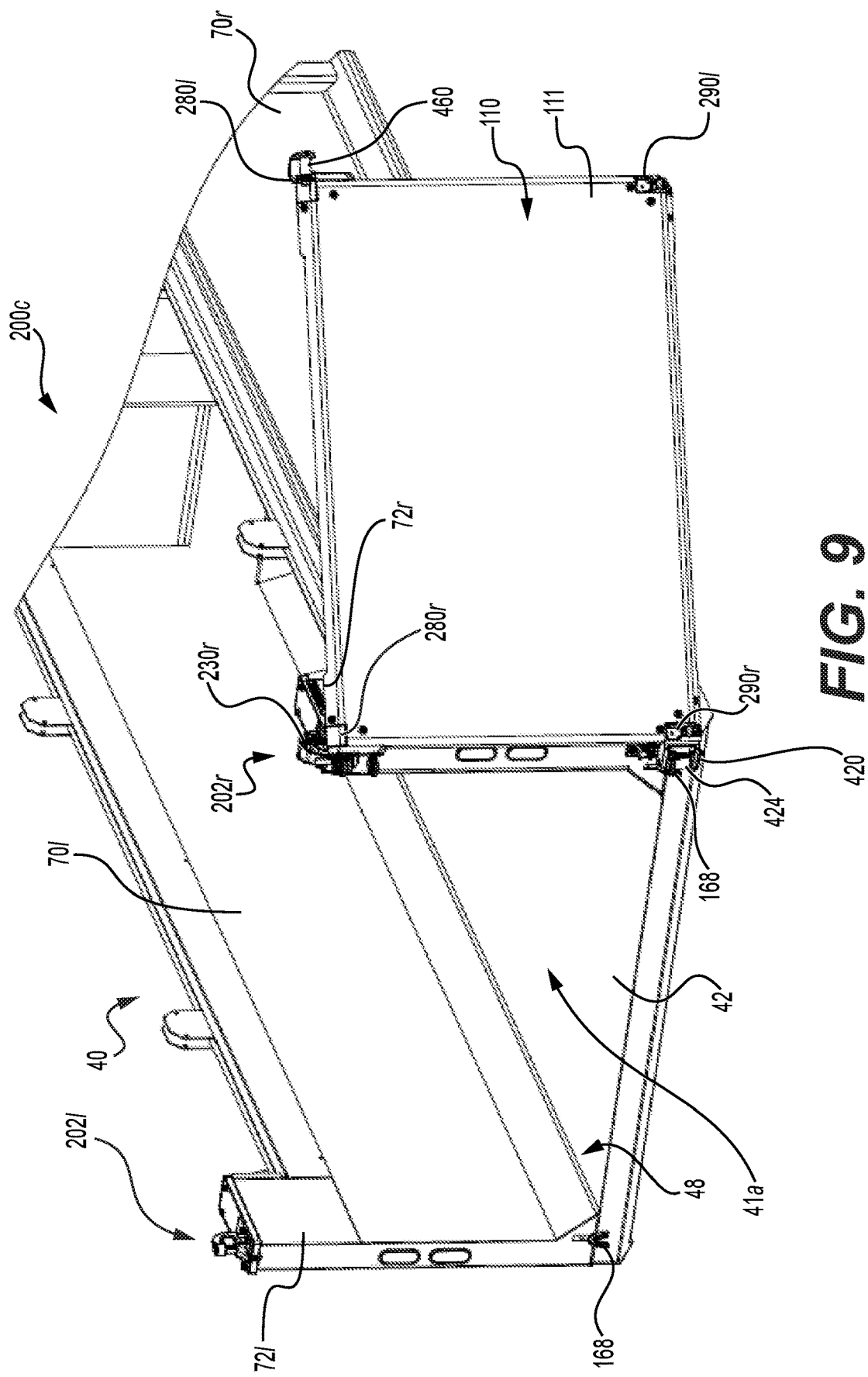
FIG. 9 is a perspective view taken from a top, rear, right side of a rear portion of the vehicle container of FIG. 1 having a hinge assembly adapted for a swing-gate opening of the door, with the door in an open position.
Figure 10:
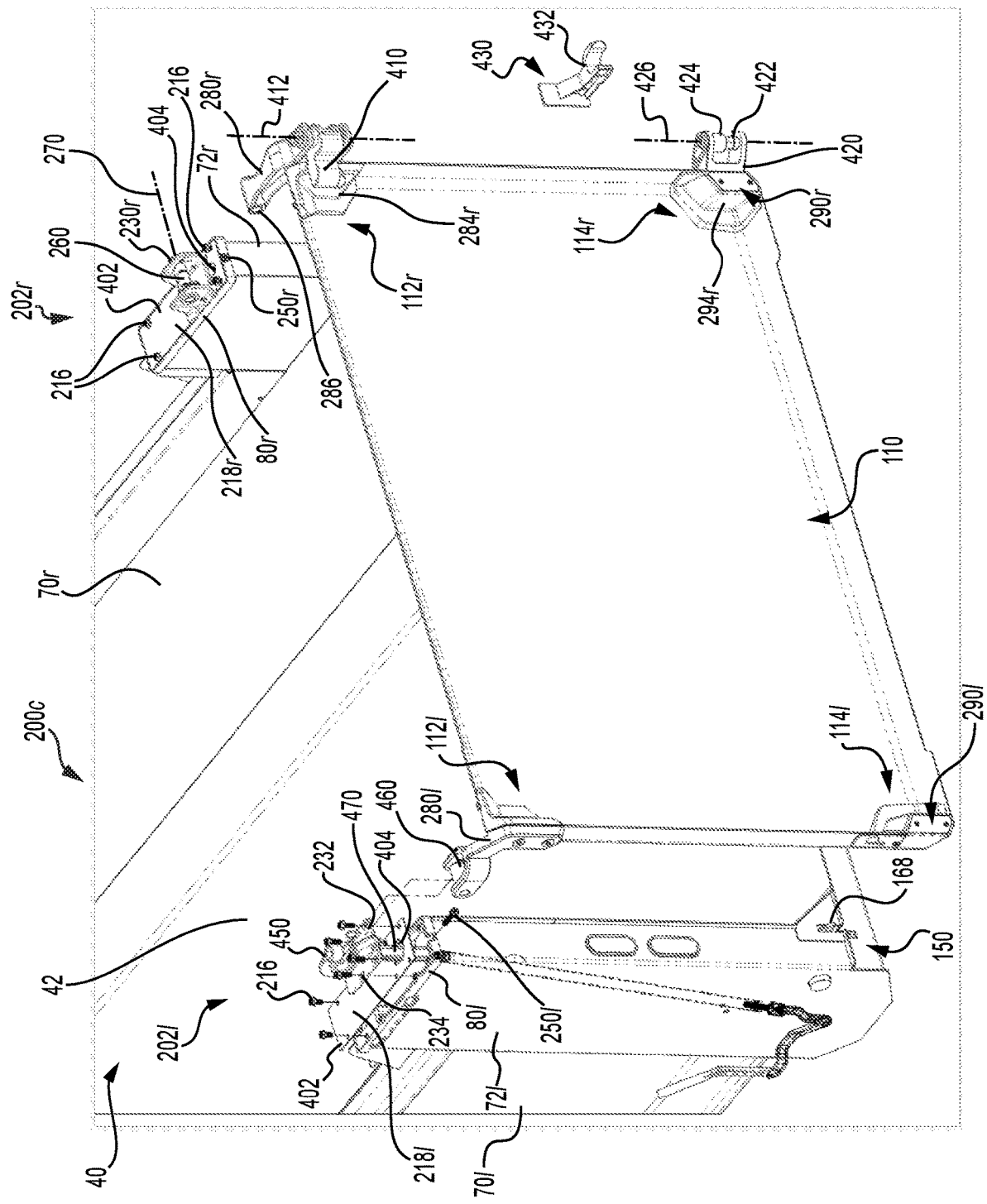

FIG. 10 is a partly exploded, perspective view taken from a top, rear, left side of a rear portion of the vehicle container and hinge assembly of FIG. 9; and FIG. 11 is a flowchart of a method for changing a pivoting configuration of a door pivotally connected to a top portion of a pillar of a vehicle container.

DETAILED DESCRIPTION

Figure 1:
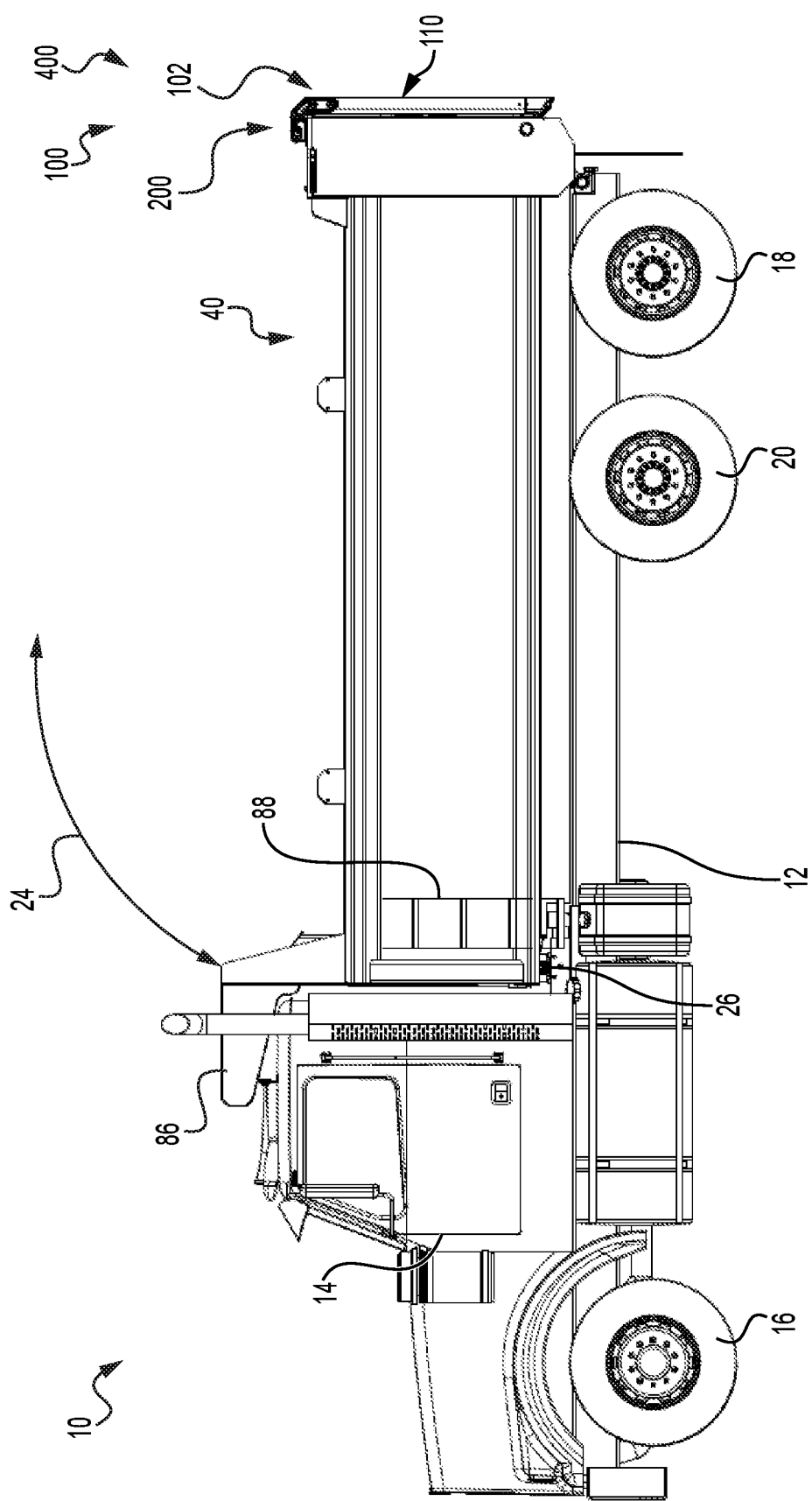
FIG. 1 is a left side elevation view of a truck having a vehicle container, which is a dump body.

FIG. 1 illustrates an embodiment of a truck 10. The truck 10 has a frame 12. A cab 14 is connected to a front of the frame 12. Two steerable front wheels 16 (only one of which is shown) are connected to the frame 12 at a front thereof. Four rear wheels 18 (two on the right, two on the left, only one of which is shown) are connected to the frame 12 at a rear thereof. Four intermediate wheels 20 (two on the right, two on the left, only one of which is shown) are connected to the frame 12 at a position forward of the rear wheels 18. It is contemplated that the truck 10 could have more or less wheels than described above.

Figure 2:
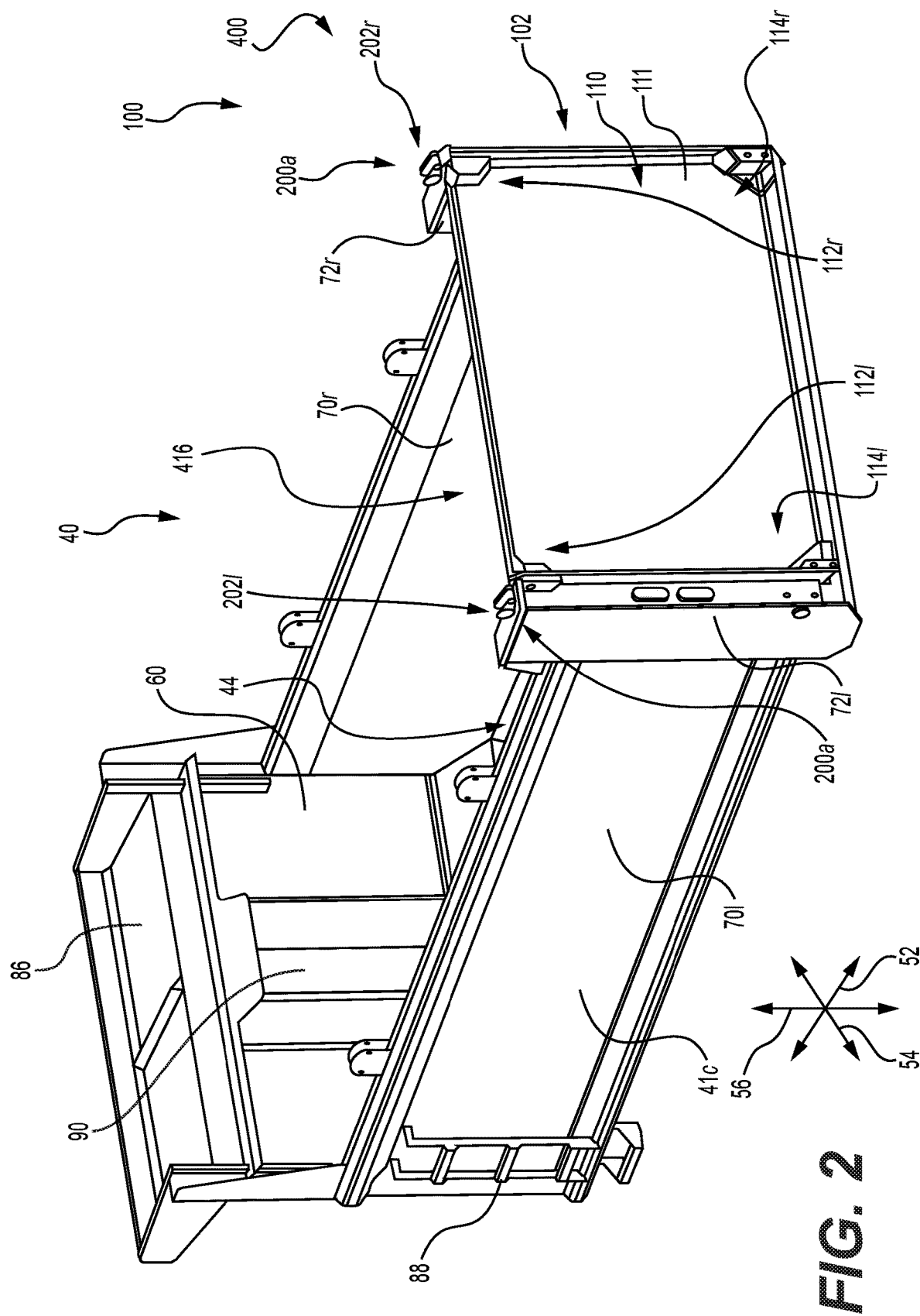
FIG. 2 is a perspective view taken from a top, rear, left side of the vehicle container of FIG. 1, with a hinge assembly adapted for single-action opening of a door, and with the door in a closed position.
Figure 3:
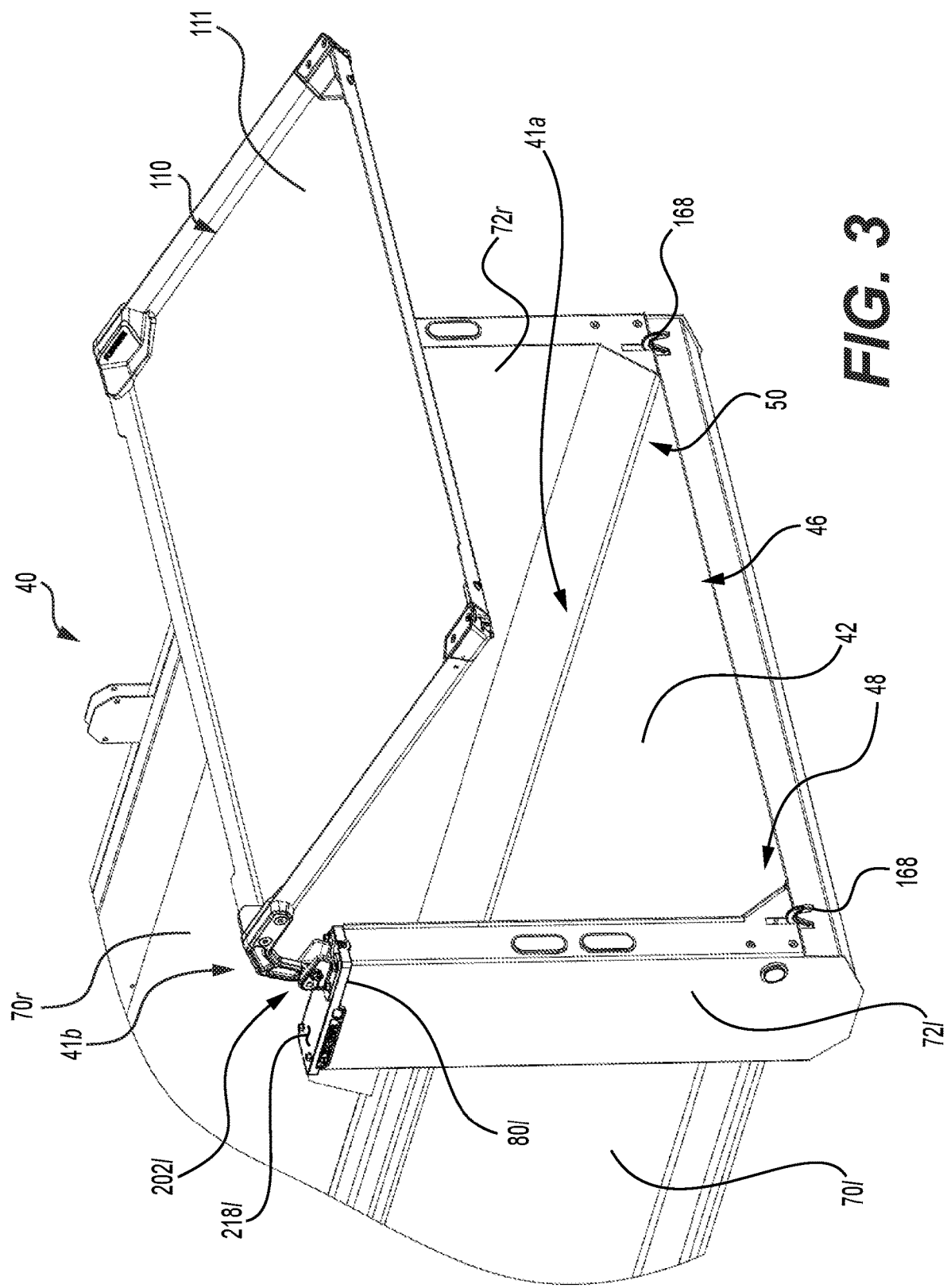
FIG. 3 is a perspective view taken from a top, rear, left side of a rear portion of the vehicle container of FIG. 2, with the door pivoted in an open position.

Referring to FIGS. 1 to 3, a vehicle container 40, which in the present embodiment of the technology is a dump body, is pivotally connected to the frame 12 at a rear thereof. The vehicle container 40 has an opening 41a defined at a rear thereof. The opening 41a provides access to an interior 41b of the vehicle container 40. A door assembly 102 including a door 110, which in the present embodiment of the technology is a tailgate plate, is pivotally connected to the vehicle container 40. The door 110 selectively closes the opening 41a, and thus selectively provides access to the interior 41b of the vehicle container 40. The vehicle container 40 can pivot between a lowered position (shown in FIG. 1) and a raised position as indicated by line 24. In the raised position, the vehicle container 40 can empty its content through the rear opening 41a thereof when the door 110 is moved in an open position, as shown in FIG. 3. A hydraulic actuator 26 is pivotally connected to the frame 12 and to the front of the vehicle container 40. The hydraulic actuator 26 can extend to pivot the vehicle container 40 to the raised position and can retract to return the vehicle container 40 to the lowered position. The above description of a truck 10 is only one possible embodiment of a truck. It is contemplated that other embodiments of the truck 10 may have a different system and/or configuration for pivoting the vehicle container 40, such as a trunnion mount, pin-to-pin, hook lift, underbody hoist, and roll off configurations, among others.

With continuing reference to FIGS. 2 to 4 and 7 to 10, a system 100 for assembling a door 110 to a vehicle container 40 will be described. Although described in the present description with reference to the dump body and the tailgate plate shown in the accompanying Figures, the system 100 could be used to assemble a door 110 of a different type, size and shape to the one described herein to a vehicle container 40 of a different type, size and shape to the one described herein. For instance, the system 100 could be used for assembling a door 110 to a vehicle container 40 that has its opening 41a defined in the front or on the side of the vehicle container 40, and not necessarily at the rear thereof. Moreover, the system 100 could be used to assemble a door 110 to a vehicle container 40 of a different type, size and shape, such as and not limited to, a shipping container, a bed of a pick-up truck, a trailer for a truck, a cargo box, etc. As such, many other embodiments of the present technology are contemplated, and the present technology is not limited to what is about to be described in the present description with reference to the dump body that is pivotally connected to the truck 10 of FIG. 1. Generally described, the system 100 allows for the pivotal connection of a door 110 to a vehicle container 40 using a hinge assembly 200 selected from a plurality of hinge assemblies, with each hinge assembly providing for a different pivoting configuration of the door 110 relative to the vehicle container 40. As will become apparent from the description below, each of the plurality of hinge assemblies 200 is removably connected to the vehicle container 40 and to the door 110, and, in some embodiments of the present technology, the plurality of hinge assemblies 200 share common components.

Still referring to FIGS. 2 to 4 and 7 to 10, a system 400 for assembling a family of vehicle containers 40 will also be described. The system 400 allows the assembly of a family of vehicle containers 40 using components common to every member of the family, and in some cases, additional components found in only some members of the family. The system 400 includes the vehicle container 40, which is common to every member of the family of containers, and the door assembly 102 which closes the opening 41a of the vehicle container 40, and selectively grants access to the interior 41b of the vehicle container 40. The door assembly 102 is also common to every member of the family of vehicle containers 40. The system 400 also includes a hinge assembly 200 adapted for pivotally connecting the door 110 of the door assembly 102 to the vehicle container 40. As mentioned above, in the present embodiment, the door 110 is a tailgate plate and, as in the system 100, the hinge assembly 200 is adapted to be removably connected to the vehicle container 40 and the door 110. Although described in the present description with reference to the dump body and the tailgate plate shown in the accompanying Figures, the system 400 could be used to assemble a family of vehicle containers 40 of various type, size and shape, such as and not limited to, a shipping container, a bed of a pick-up truck, a trailer for a truck, a cargo box, etc. As such, many other embodiments are contemplated and the present technology is not limited to what is about to be described in the present description with reference to the dump body that is pivotally connected to the truck 10 of FIG. 1.

Still referring to FIGS. 2 to 4 and 7 to 10 and as indicated above, in both systems 100, 400, the hinge assembly 200 is selected from a plurality of hinge assemblies. In the embodiments described in the present description, the hinge assembly 200 is selected from a single-action opening hinge assembly 200a shown in FIGS. 2 to 4, a high-lift gate opening hinge assembly 200b shown in FIGS. 7 and 8, and a swing-gate opening hinge assembly 200c shown in FIGS. 9 and 10. Other hinge assemblies, such as a double action hinge assembly, are contemplated to be used in the systems 100, 400. Each of the hinge assemblies 200a, 200b, 200c provides for a different pivoting configuration of the door 110 relative to the vehicle container 40.

Since the hinge assemblies 200a, 200b, 200c are removably connected to the vehicle container 40 and the door 110, the systems 100, 400 allow, in some circumstances, more convenient connection of the door assembly 102 to the vehicle container 40 compared to conventional welding of the components of the door assembly 102, which leads to shorter assembly times. Moreover, the systems 100, 400 also allow, in some circumstances, convenient change of the pivoting configuration of the door 110 relative to the vehicle container 40, which leads to greater flexibility for a user as the configuration of the pivoting of the door 110 can be conveniently changed if needed. Furthermore, as will become apparent from the following description, the system 100, 400 also allow, in some embodiments, the adjustment of the position of the door 110 relative to the vehicle container 40 along at least one axis defined consistently with at least one of a lengthwise direction 52, a widthwise direction 54, and a heightwise direction 56 of the vehicle container 40 (FIG. 2). Such adjustment of the position of the door 110 relative to the vehicle container 40 may lead, in some circumstances, to a better fit of the door 110 relative to the vehicle container 40.

It is to be noted that the following description is applicable to both systems 100, 400. Before describing in more details the systems 100, 400 and the hinge assemblies 200a, 200b, 200c, the vehicle container 40 and the door assembly 102, which includes the door 110, will first be described.

Figure 7:
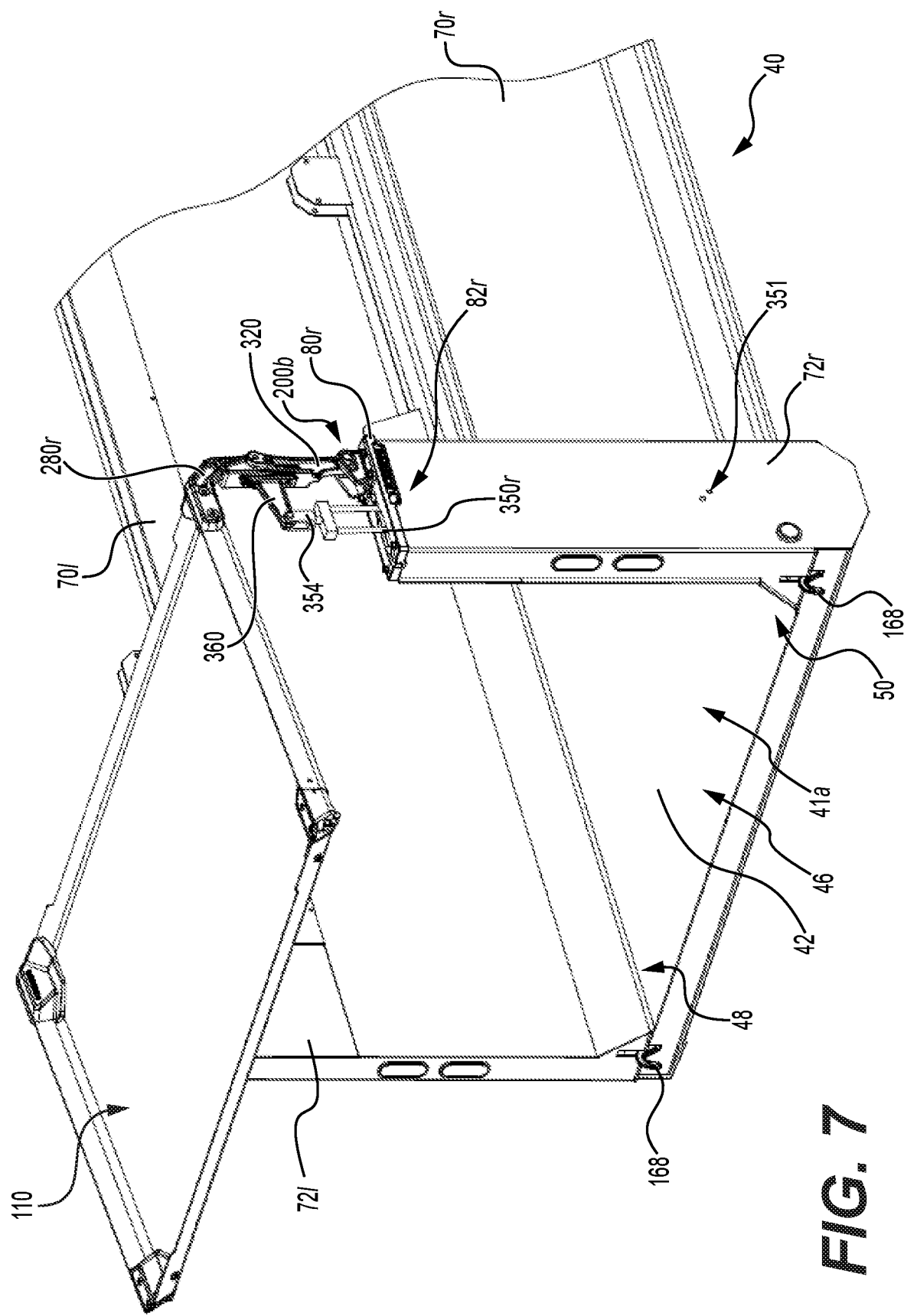
FIG. 7 is a perspective view taken from top, rear, right side of a rear portion of the vehicle container of FIG. 1 having a hinge assembly adapted for a high-lift gate opening of the door, with the door in an open position.

Referring to FIGS. 2, 3 and 7, the vehicle container 40 has a floor 42. The floor 42 has a front end 44 and a rear end 46. The floor 42 also has a left side 48 and a right side 50. A front wall 60 is connected to the front end 44 of the floor 42 and extends upwardly from the floor 42. A left side wall 70*l* is connected to the floor 42 and to the front wall 60. The left side wall 70*l* extends upwardly from the left side 48 of the floor 42 and rearward of the front wall 60. A rear left pillar 72*l* is connected to the left side wall 70*l* and to the rear end 46 of the floor 42. The rear left pillar 72*l* extends upwardly from the rear end 46 of the floor 42 and rearward of the left side wall 70*l*. In other embodiments, the rear left pillar 72*l* could be slanted forwardly with respect to the rear end 46 of the floor 42. In other embodiments, the rear left pillar 72*l* could be integral to the left side wall 70*l* and/or the floor 42. In yet other embodiments, the rear left pillar 72*l* could have a height similar to that of the left side wall 70*l*. A left base 80*l* (FIGS. 3 and 4) is connected to a top portion 82*l* of the rear left pillar 72*l*. The left base 80*l* defines threaded holes 84 for receiving fasteners of the hinge assemblies 200a, 200b, 200c which will be described below. In the present embodiment, the left base 80*l* is welded to the rear left pillar 72*l* and permits the removable connection of the hinge assemblies 200a, 200b, 200c to the vehicle container 40.

Still referring to FIGS. 2, 3 and 7, the vehicle container 40 also has a right side wall 70*r* connected to the floor 42 and to the front wall 60. The right side wall 70*r* extends upwardly from the right side 50 of the floor 42 and rearward of the front wall 60. A rear right pillar 72*r* is connected to the right side wall 70*r* and the rear end 46 of the floor 42. The rear right pillar 72*r* extends upwardly from the rear end 46 of the floor 42 and rearward of the right side wall 70*r*. In other embodiments, the rear right pillar 72*r* could be slanted forwardly with respect to the rear end 46 of the floor 42. In other embodiments, the rear right pillar 72*r* could be integral to the right side wall 70*r* and/or the floor 42. In yet other embodiments, the rear right pillar 72*r* could have a height similar to that of the right side wall 70*r*. A right base 80*r* is connected to a top portion 82*r* of the rear right pillar 72*r* (FIG. 7). The right base 80*r* also defines threaded holes 84 for receiving fasteners of the hinge assemblies 200a, 200b, 200c which will also be described below. In the present embodiment, the right base 80*r* is welded to the rear right pillar 72*r* and permits the removable connection of the hinge assemblies 200a, 200b, 200c to the vehicle container 40.

The opening 41a of the vehicle container 40 closed by the door 110 is defined by the rear end 46 of the floor 42 and the left and right rear pillars 72*l*, 72*r*. Together, the floor 42, the front wall 60 and the side walls 70*l*, 70*r* define a body 41c (FIG. 2) of the vehicle container 40, to which are connected the pillars 72*l*, 72*r*. In other embodiments, the vehicle container 40 could have a top wall and/or the opening 41a could be defined in one of the left side wall 70*l*, the right side wall 70*r*, and the front wall 60.

Referring to FIG. 2, a cab cover 86 is connected to the top of the front wall 60 and extends forwardly thereof. As can be seen in FIG. 1, when the vehicle container 40 is in the lowered position, the cab cover 86 extends over the top of the rear portion of the cab 14. It is contemplated that the cab cover 86 could be omitted. A ladder 88 is connected to the front of the left side wall 70*l* of the vehicle container 40. It is contemplated that the ladder 88 could be connected elsewhere on the vehicle container 40. It is also contemplated that the ladder 88 could be omitted.

As best seen in FIG. 2, the front wall 60 defines a hoist well 90 at a center thereof. A pair of brackets (not shown) is connected to the front of the front wall 60 near a bottom thereof in alignment with the hoist well 90. The hydraulic actuator 26 is received in the hoist well 90 between the brackets. The hydraulic cylinder 26 is pivotally connected to the brackets. As mentioned above, the hydraulic cylinder 26 is connected at its lower end to the frame 12. It is contemplated that the front wall 60 could not be provided with the hoist well 90, in which case the hydraulic actuator 26 would be provided completely in front of the front wall 60. It is contemplated that the hydraulic actuator 26 could be mounted between the frame 12 and the vehicle container 40 in other ways.

Referring to FIGS. 2 and 3, the door assembly 102 includes the door 110 which is dimensioned to extend across the rear of the vehicle container 40 and overlap the rear left and right pillars 72*l*, 72*r* for closing the opening 41a. When the vehicle container 40 is in the lowered position, the door 110 abuts the rear side of the rear pillars 72*l*, 72*r*. When the vehicle container 40 is pivoted to the raised position, the door 110 pivots away from the rear pillars 72*l*, 72*r* by gravity, as shown in FIG. 3. The door 110 is a panel 111 having an upper left portion 112*l*, an upper right portion 112*r*, a lower left portion 114*l*, and a lower right portion 114*r*. The panel 111 further has a bent left portion 116*l*, a bent right portion 116*r*, an upper bent portion 118, and a lower bent portion 120 (FIG. 5A). It is contemplated that in other embodiments, the door assembly 102 could further include additional accessories, such as an inspection door, removably connected to the panel 111 of the door 110.

Referring to FIGS. 6A to 6F, the vehicle container 40 further includes a door latch system 150 adapted to lock the door 110 in the closed position, i.e. against the rear pillars 72*l*, 72*r*. The door latch system 150 includes an extendible and retractable actuator 152 pivotally connected to a bottom face of the floor 42 of the vehicle container 40 via an actuator bracket 152a. The actuator 152 is a pneumatic actuator, but it is contemplated that the actuator could be an electric, hydraulic or a manual actuator in other embodiments. The actuator 152 is operatively connected to a linkage assembly 160 including clevis pins 162 and links 164. The actuator 152 and the linkage assembly 160 are positioned below the bottom face of the floor 42 and above a bottom wall of the vehicle container 40. The actuator 152 and the linkage assembly 160 are thus at least partially sheltered from debris and dust. A base 164a is connected to the floor 42 of the vehicle container 40. A lower link 164b is pivotally connected to the base 164a via the clevis pin 162a. An upper link 164c is pivotally connected to the lower link 164b and to a threaded link 164d via a clevis pin 162b. The threaded link 164d is threadably connected to a rod 152b of the actuator 152. The upper link 164c is pivotally connected to a rod link 164e via a clevis pin 162c. The clevis pins 162a, 162b, 162c define three pivot axes. The pivot axes are represented as + signs in FIGS. 6C and 6E. A rod 166 is connected to the rod link 164e. The rod 166 is pivotally connected to a bracket 166a connected to the floor 42 and to the base 164a. Grease ports 166b are connected to the bracket 166a for injecting grease between the rod 166 and the bracket 166a. Self-lubricating rings 166c are disposed between the bracket 166a and the rod 166, and between the rod 166 and the left and right side walls 70l, 70r in order to facilitate the pivoting of the rod 166. Left and right hooks 168 are connected to the rod 166. The left and right hooks 168 have a tapered shape. The rod 166 is pivotable about an axis 170. Pins 172 are connected to the door 110 and extend in recesses 174 defined in the door 110. Upon extension and retraction of the actuator 152 via the linkage assembly 160, the rod 166 pivots about the axis 170 and the hooks 168 catch or release the pins 172, thereby locking and unlocking the door 110 in the closed position. The left and right hooks 168 have a stop 168a structured to abut the floor 42 of the vehicle container 40 when fully pivoted to the unlocked position seen in FIGS. 6C and 6D.

Figure 6D:
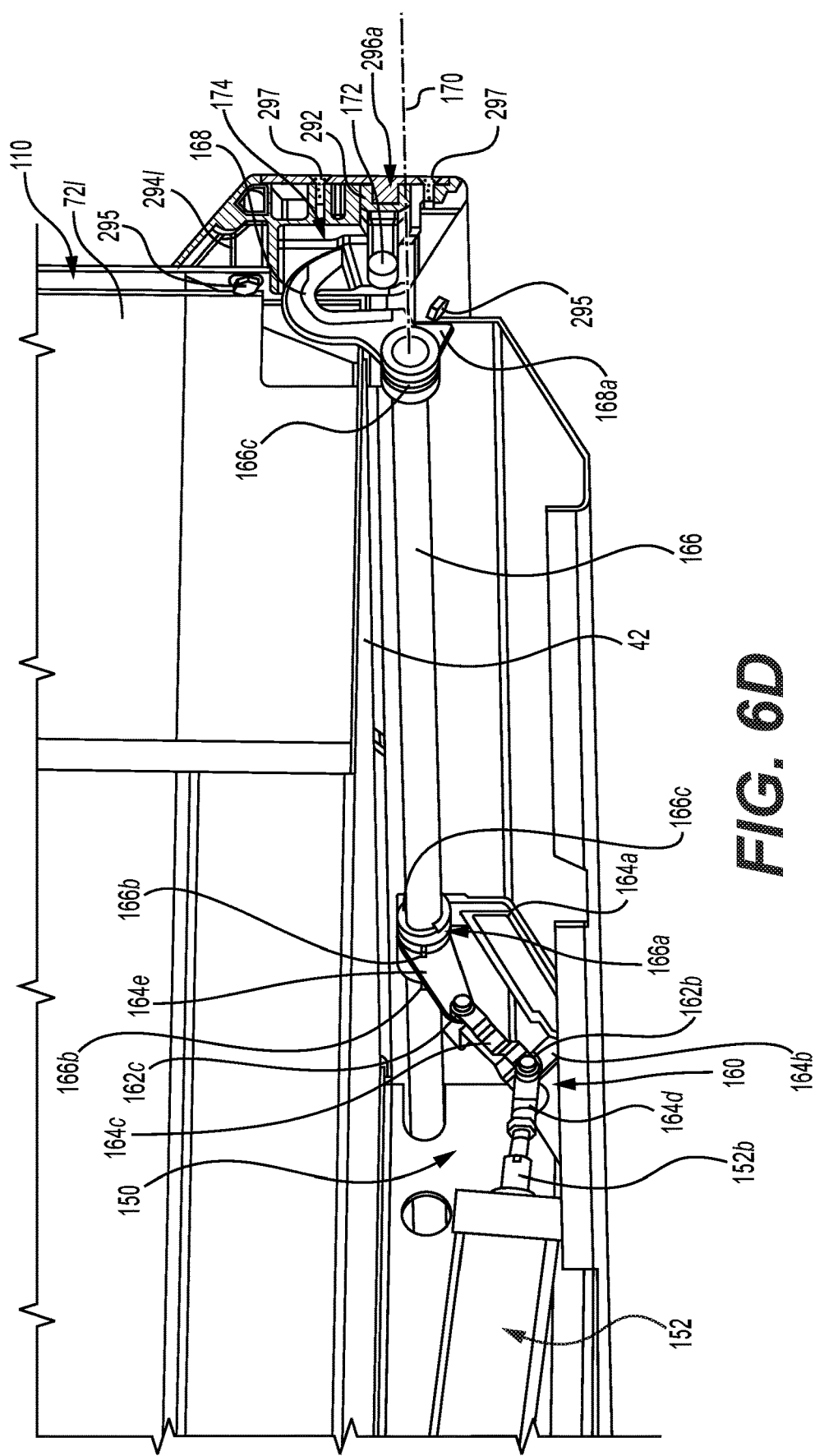
FIG. 6D is a perspective view taken from a front, left side of the door latch system, door and vehicle container of FIG. 6C.
Figure 6E:
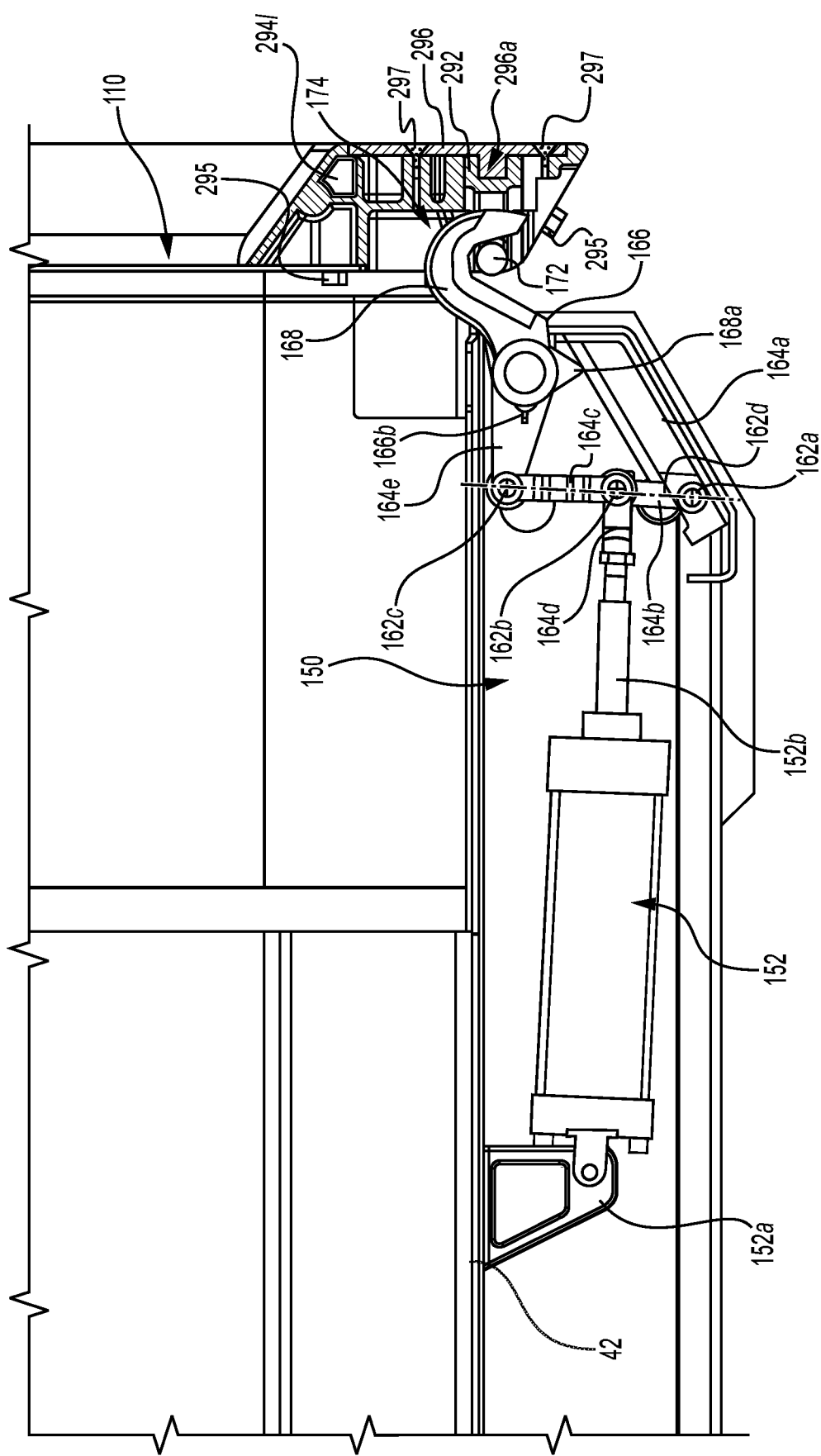
FIG. 6E is a left side elevation view of the door latch system, the door and the vehicle container of FIG. 6C, with the door latch system in a locked position.

Referring to FIGS. 6C and 6D, when the actuator 152 is retracted, the hooks 168 are pivoted about the axis 170 in the unlocked position and are received in the rear pillars 72l, 72r. The hooks 168 are withdrawn from the recesses 174 and release the pins 172, thereby unlocking the door 110 from the vehicle container 40 and allowing it to pivot in the open position shown in FIGS. 3, 7 and 10. Referring to FIGS. 6E and 6F, when the actuator 152 is extended, the hooks 168 are pivoted about the axis 170 so as to project outwardly of the rear pillars 72l, 72r. The hooks 168 are received in the recesses 174 and catch the pins 172, thereby locking the door 110 to the vehicle container 40 in the closed position.

It is to be noted that when the actuator 152 is retracted to the position shown in FIGS. 6C and 6D (i.e. the hooks 168 are in the unlocked position), the link 164d is moved forward and the pivot axis of the clevis pin 162b is on a front side of an imaginary line 162d passing through the pivot axis of the clevis pin 162a and the pivot axis of the clevis pin 162c. When the actuator 152 is extended to the position shown in FIGS. 6E and 6F (i.e. the hooks 168 are in the locked position), the link 164d is moved rearward and the pivot axis of the clevis pin 162b is on a rear side of the imaginary line 162d passing through the pivot axis of the clevis pin 162a and the pivot axis of the clevis pin 162c. This over-center configuration of the linkage assembly 160 clamps the door latch system 150 in the locked position. This way, the actuator 152 does not have to exert any force to keep the door latch system 150 in the locked position, and the hooks 168 are prevented from pivoting from the locked position (FIGS. 6E and 6F) to the unlocked position (FIGS. 6C and 6D). Other types of door latch systems could be used in other embodiments.

Referring back to FIGS. 2 to 4, the hinge assembly 200a will be described in more details. As mentioned above, the hinge assembly 200a provides for a single-action opening of the door 110, as shown in FIG. 3. The hinge assembly 200a includes a left hinge assembly 202l and a right hinge assembly 202r. In the present embodiment, the left and right hinge assemblies 202l, 202r are mirror images and have some components that are identical in both hinge assemblies 202l, 202r. Therefore, for simplicity, only the components of the left hinge assembly 202l will be described, unless mentioned otherwise. It is to be noted that having identical components for the left and right hinge assemblies 202l, 202r presents the advantage of requiring less side-specific parts, which helps streamline the inventory of components during manufacturing and/or when servicing.

Figure 4:
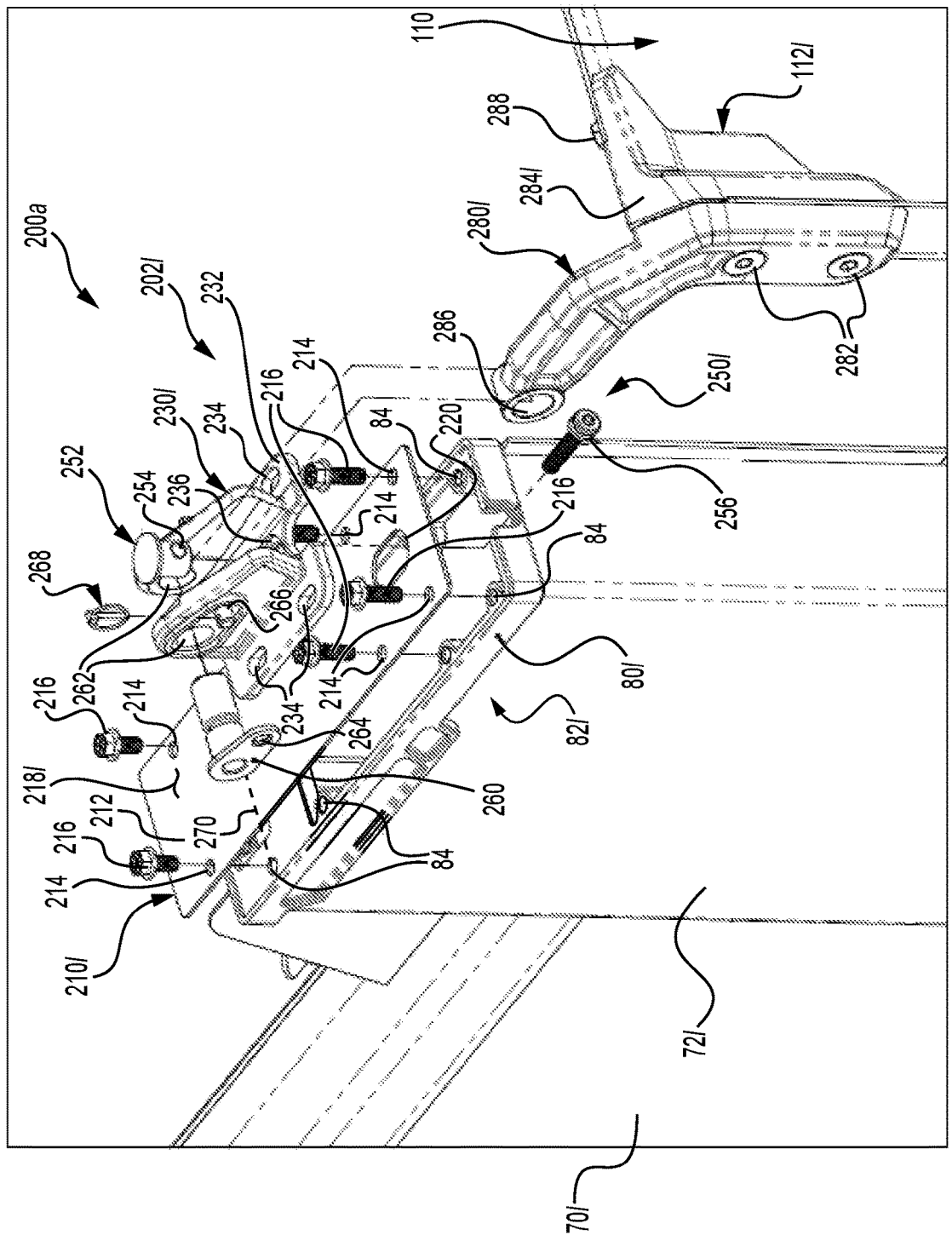
FIG. 4 is a close-up, exploded, perspective view taken from a top, rear, left side of an upper left hinge assembly of the vehicle container of FIG. 2.

Referring to FIGS. 3 and 4, the left hinge assembly 202l includes a left adapter assembly 210l adapted to be removably connected to the base 80l. The left adapter assembly 210l includes a plate 212 defining holes 214 corresponding to the threaded holes 84 of the base 80l. Fasteners 216 connect the plate 212 to the base 80l when extending through the holes 214 and engaging the threaded holes 84. The plate 212 further defines a slotted hole 220 in a central portion thereof. When connected, the plate 212 defines a top face 218l of the rear left pillar 72l, as best seen in FIG. 3.

The left hinge assembly 202l further includes a left pillar bracket 230l adapted to be removably connected to the left adapter assembly 210l. As best seen in FIG. 4, the left pillar bracket 230l is positioned at the rear of the left adapter assembly 210l. The left pillar bracket 230l has a flange 232 abutting the plate 212, and slotted holes 234 are defined in the flange 232. Four of the fasteners 216 extend through four corresponding slotted holes 234, as well as through the corresponding holes 214 and 84 as indicated above. The flange 232 also defines a central hole 236. In other embodiments, the hole 236 could be omitted.

The left hinge assembly 202l also includes a left adjuster assembly 250l. The left adjuster assembly 250l includes an insert 252 extending in the holes 220, 236. A threaded hole 254 is defined in the insert 252. When the insert 252 extends through the holes 220, 236, a screw 256 engages the threaded hole 254. As seen in FIG. 4, the screw 256 is pointing towards the front of the vehicle container 40 so as to be inserted from a rear of the rear left pillar 72l. By screwing or unscrewing the screw 256, the left adjuster assembly 250l permits the adjustment of the position of the left pillar bracket 230l relative to the plate 212 and the base 80l in the lengthwise 52 direction of the vehicle container 40 defined consistently by the front and rear ends 44, 46 of the floor 42 before the fasteners 216 extending in the holes 234 are tightened.

In other embodiments, it is contemplated that the slotted holes 234 could be shaped to permit the adjustment of the position of the left pillar bracket 230l relative to the plate 212 and the base 80l simultaneously in the lengthwise direction 52 and in the widthwise direction 54 of the vehicle container 40 defined consistently with left and right sides 48, 50 of the floor 42. As mentioned above, as the left and right hinge assemblies 202l, 202r have identical components, the right hinge assembly 202r also has a right adjuster assembly (not shown). The left adjuster assembly 250l and the right adjuster assembly also prevent the left pillar bracket 230l and the right pillar bracket from moving in the lengthwise direction 52 when the door 110 moves from the open position to the closed position and abuts the rear pillars 72l, 72r.

Still referring to FIG. 4, a hinge pin 260 extends through apertures 262 defined in the left pillar bracket 230l. The hinge pin 260 has an aperture 264 defined therein which is shaped and dimensioned to receive a lateral projection 266 of the left pillar bracket 230l. When the projection 266 is received in the aperture 264, rotation of the hinge pin 260 relative to the left pillar bracket 230l is prevented. The hinge pin 260 is retained on the left pillar bracket 230l via a retaining pin 268 extending through an aperture defined in the projection 266. The hinge pin 260 defines a pivot axis 270 about which the door 110 pivots between the open and closed positions.

Referring to FIGS. 4 to 5C, the left hinge assembly 202l further includes a left door bracket 280l adapted to be removably connected to the upper left portion 112l of the door 110. As best seen in FIG. 5C, the left door bracket 280l is connected to the door 110 using fasteners 282 engaging an upper left door corner bracket 284*l*. The left door bracket 280*l* defines an aperture 286 shaped and dimensioned for receiving the hinge pin 260. The upper left door corner bracket 284*l* is connected to the door 110 using fasteners 288 and the fasteners 282. The bent left portion 116*l* (FIG. 5C) of the door 110 is sandwiched between the upper left door corner bracket 284*l* and the left door bracket 280*l*. The fasteners 282 extend through holes 117 defined in the bent left portion 116*l* and permit the connection of both the upper left door corner bracket 284*l* and the left door bracket 280*l* to the door 110. One of the fasteners 288 extends through a hole 289 defined in the upper bent portion 118 of the door 110. When the left door bracket 280*l* is connected to the left pillar bracket 230*l* via the hinge pin 260, the door 110 pivots about the pivot axis 270 between the open and closed positions. Similarly, a right door bracket 280*r* is adapted to be removably connected to the upper right portion 112*r* of the door 110. The right door bracket 280*r* is connected to the bent right portion 116*r* of the door 110 using fasteners 282 engaging an upper right door corner bracket 284*r*. The right door bracket 280*r* and the upper right door corner bracket 284*r* are mirror images of the left door bracket 280*l* and the upper left door corner bracket 284*l* respectively.

It is contemplated that the position of the door 110 relative to the vehicle container 40 could be adjusted in the widthwise direction 54 by performing the following steps: (i) loosely connecting the left and right pillar brackets 232*l*, 232*r* to the bases 80*l*, 80*r* with the fasteners 216; (ii) positioning the door 110 against the rear pillars 72*l*, 72*r*, (iii) connecting the left door bracket 280*l* to the left pillar bracket 232*l* and connecting the right door bracket 280*r* to the right pillar bracket 232*r* using left and right hinge pins 260; (iv) moving the door 110 along the widthwise direction 54 as desired; and (v) tightening the fasteners 216 to secure the left and right pillar brackets 232*l*, 232*r* to the bases 80*l*, 80*r*.

Referring to FIGS. 5A and 5B, the systems 100, 400 further include left and right adjustment screw assemblies 290*l*, 290*r* connected to the door 110 in the lower left and right portions 114*l*, 114*r* thereof. The left and right adjustment screw assemblies 290*l*, 290*r* have an adjustment screw 292. The adjustment screw 292 is integral to the pin 172, as best seen in FIGS. 6C to 6F, but the adjustment screw 292 could be connected to the pin 172 otherwise in other embodiments. Each adjustment screw 292 is enclosed in a corresponding lower left and right door corner bracket 294*l*, 294*r*, which are connected to the door 110 using fasteners 295. The adjustment screw 292 is thus threadably connected to the door 110 via the corresponding left and right door corner bracket 294*l*, 294*r*. One of the fasteners 295 extends through a hole 295*a* defined in the lower bent portion 120 of the door 110. A cap 296 covers the head of each adjustment screw 292. As best seen in FIGS. 6C to 6F, the cap 296 has a projection 296*a* that is inserted in the head of the adjustment screw 292, which prevents the rotation thereof. The cap 296 is connected to the corresponding adjustment screw assembly 290*l*, 290*r* using fasteners 297.

Referring to FIGS. 5A to 6F, it is to be noted that the screw adjustment assemblies 290*l*, 290*r* are accessible from a rear side of the door 110 after removing the caps 296. It is also to be noted that the hooks 168 pivot about the axis 170, and that the axis 170 is not moveable using an eccentric assembly as in conventional door latch systems. The adjustment of the door latch system 150 is performed by removing the caps 296 from the left and right door corner brackets 294*l*, 294*r*, and by screwing or unscrewing the adjustment screws 292, which changes the position of the pins 172 relative to the hooks 168. Thus, the screw adjustment assemblies 290*l*, 290*r* provides in some circumstances a more precise and more convenient adjustment of the door latch system 150 compared to conventional systems using an eccentric assembly, which are often only accessible from an underside of the vehicle container 40. Furthermore, in conventional latch systems, adjusting the eccentric assembly also requires the adjustment of the extension of a rod of the actuator. In the present door latch system 150, there is no need to adjust the extension of the rod 152*b* of the actuator 152 to adjust how the hooks 168 catch and release the pins 172. Moreover, since the adjustment screw assemblies 290*l*, 290*r* are sheltered by the left and right door corner brackets 294*l*, 294*r* and the caps 296, they are less exposed to debris, dust and bad weather.

Furthermore, by screwing and unscrewing the adjustment screws 292, the left and right adjustment screw assemblies 290*l*, 290*r* are adapted for adjusting a position of the door 110 relative to the vehicle container 40 in the lengthwise direction 52. For example, the left and right adjustment screw assemblies 290*l*, 290*r* can be used to set the spacing between the pillars 72*l*, 72*r* and the door 110 so as to make sure that the door latch system 150 adequately locks the door 110 in the closed position. Thus, using the left adjuster assembly 250*l* and the right adjuster assembly 250*r*, and the adjustment screw assemblies 290*l*, 290*r*, a user can adjust and set the position the door 110 against the vehicle container 40 in the lengthwise direction 52 as desired. Moreover, since the hooks 168 have a tapered shape, the pins 172 are drawn towards the vehicle container 40 when the hooks 168 pivot from the unlocked position (FIG. 6C) to the locked position (FIG. 6E).

Moreover, the combined action of the left and right adjustment screw assemblies 290*l*, 290*r* and the door latch system 150 also permits for adjusting a position of the door 110 relative to the vehicle container 40 in the heightwise direction 56 of the vehicle container 40. Referring to FIGS. 6C to 6F, the position of the door 110 relative to the vehicle container 40 can be adjusted by performing the following steps: (i) positioning the door 110 against the rear pillars 72*l*, 72*r*, (ii) screwing the left and right adjustment screws 292 completely; (iii) pivoting the hooks 168 about the axis 170 so as to lock the door 110 in the closed position (as in FIGS. 6E and 6F); (iv) unscrew the left and right adjustment screws 292 until the pins 172 abut the hooks 168 and since the hooks 168 have a tapered shape, screwing or unscrewing the adjustment screws 292 raises or lowers the corresponding side of the door 110 relative to the vehicle container 40; and (v) connecting the cap 296 to the corresponding lower left and right door corner bracket 294*l*, 294*r* so as to insert the projection 296*a* in the head of the adjustment screw 292 and prevent the rotation thereof. In the present embodiment, the hooks 168 and the adjustment screws 292 provide for a height adjustment of the door 110 relative to the vehicle container 40 of about 0.5 inch (about 12.7 mm). More or less adjustment could be provided by the hooks 168 and the adjustment screws 292 in other embodiments.

Referring back to FIGS. 5A to 5C, the connection of the door brackets 280*l*, 280*r*, 294*l*, 294*r* to the panel 111 of the door 110 using the fasteners 282, 288, 295 is advantageous compared to the welded connection of the hinge assemblies to the door found in conventional door assemblies for a vehicle container.

The high temperature involved in most welding processes causes distortion, warpage, and stresses in the door of conventional door assemblies. Such warpage is difficult to prevent and even more difficult to predict accurately. The warpage makes the process of fitting the door to the vehicle container difficult, and grinding operations are very often necessary to provide an adequate fit of the door to the vehicle container. To minimize the warpage induced by welding, a conventional door assembly for a vehicle container has reinforcement ribs and/or tubes welded to the door to increase the rigidity thereof, and thus reduce the warpage. However, adding such reinforcement ribs and tubes is time-consuming, costly, adds weight to the door assembly and since these reinforcing components are welded to the door, there are more welds on the door assembly that are subject to cracks and failures over time. Cracks and failures in welds are a major concern in dump bodies as welds tend to fail prematurely because of the vibrations and the energy induced by the impact of the door against the vehicle container body when the door is moved from the open position to the closed positions. Cracks in welds have to be carefully monitored, and the service life of a door is often dependent on the severity and number cracks found in the welds thereof.

The door 110 of the present systems 100, 400 presents the advantage of having none of the heat-related stresses and deformations found in conventional door assemblies since the connection of the door brackets 280*l*, 280*r*, 294*l*, 294*r* to the panel 111 of the door 110 is performed using the fasteners 282, 288, 295. Since heat-related stresses and deformations are avoided, the door 110 is also more planar than a comparable conventional door that has components welded thereto. Having a more planar door 110 facilitates the adjustment thereof to the vehicle container 40.

Moreover, it had been found that having the bent portions 116*l*, 116*r*, 118, 120 increases the rigidity of the door 110 in the peripheral portions thereof without adding weight to the door 110. In some embodiments, the door 110 can be as much as thirty percent lighter than a conventional door of a similar size. The center portion of the door 110 is free of bent portions and/or reinforcements and remains more compliant than the peripheral portions. The center portion of the door 110 is thus capable of absorbing vibrations and dissipating the energy caused by the impact of the door 110 with the vehicle container 40 when moved from the open position to the closed position better than a conventional door. Furthermore, since the door 110 is free of welds, the issues of cracks and failures of the welds over time are non existent. The service life of the door 110 is thus increased compared to a conventional door having hinge assemblies and reinforcement ribs and/or tubes welded thereto.

Figure 8:
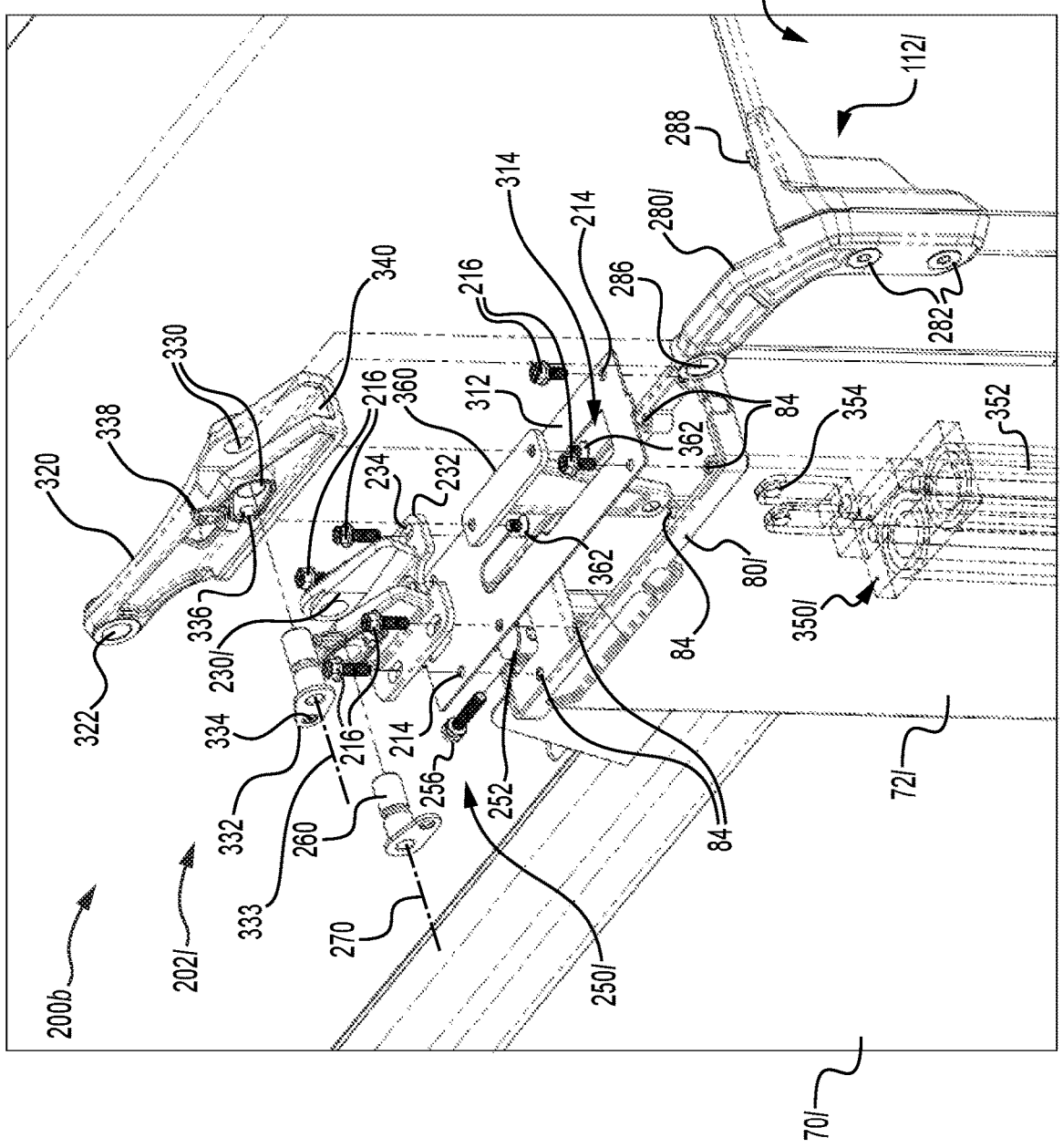
FIG. 8 is a close-up, exploded, perspective view taken from a top, rear, left side of an upper left hinge assembly of the hinge assembly of FIG. 7, with an actuator assembly shown in phantom lines.

Referring now to FIGS. 7 and 8, the hinge assembly 200*b* will be described in details. As mentioned above, the hinge assembly 200*b* provides for a high-lift gate action opening of the door 110, as shown in FIG. 7. The hinge assembly 200*b*, like the hinge assembly 200*a*, includes a left hinge assembly 202*l* and a right hinge assembly 202*r*. In the present embodiment, the left and right hinge assemblies 202*l*, 202*r* are mirror images and have several identical components, and many of these components are similar or the same as the ones described above with reference to the hinge assembly 200*a*. Therefore, for simplicity, only the components of the left hinge assembly 202*l* will be described, and elements of the hinge assembly 200*b* that are the same as or similar to those of the hinge assembly 200*a* have been labeled with the same reference numerals and will not be described again in detail.

The hinge assembly 200*b* has the same left pillar bracket 230*l* as the one described above with reference to the hinge assembly 200*a*, and the same left adjuster assembly 250*l*, with the difference being that the screw 256 is pointing towards the rear of the vehicle container 40 so as to be inserted from a front of the rear left pillar 72*l*. The hinge assembly 200*b* has a plate 312. The plate 312 defines an aperture 314. The plate 312 is connected to the base 80*l* using the fasteners 216. As seen in FIGS. 4 and 8, the left pillar bracket 230*l* is located at different positions with respect to the base 80*l* the hinge assemblies 200*a*, 200*b*. This is also the case for the right pillar bracket.

The hinge assembly 200*b* further includes an extension arm 320. The extension arm 320 is an elongated member, which defines a front aperture 322. The shape and dimensions of the extension arm 320 near the front aperture 322 is similar to that of the door bracket 280*l* near the aperture 286. The extension arm 320 is pivotally connected to the left pillar bracket 230*l* via the hinge pin 260, which extends through the front aperture 322. The extension arm 320 further defines rear apertures 330 located rearward of the front aperture 322. The door bracket 280*l*, which is the same as the one described above with reference to the hinge assembly 200*a*, is pivotally connected to the extension arm 320 via another hinge pin 332. The hinge pin 332 defines a pivot axis 333 being offset of the pivot axis 270 defined by the hinge pin 260. In the present embodiment, the pivot axis 333 extends parallel and at the rear of the pivot axis 270. As for the hinge pin 260 and the left pillar bracket 230*l*, the hinge pin 332 has an aperture 334 defined therein which is shaped and dimensioned to receive a lateral projection 336 of the extension arm 320. When the projection 336 is received in the aperture 334, rotation of the hinge pin 332 relative to the extension arm 320 is prevented. The hinge pin 332 is retained on the extension arm 320 via a retaining pin 338 extending through an aperture defined in the projection 336.

The extension arm 320 further has an abutment portion 340 extending between the rear apertures 330. When the door bracket 280*l* is pivotally connected to the extension arm 320 via the hinge pin 332, the door bracket 280*l* partially nested in the extension arm 320. As can be understood from FIG. 7, the door bracket 280*l* abuts the abutment portion 340 when the door 110 is pivoted in the open position.

Referring to FIGS. 7 and 8, the hinge assembly 200*b* further includes left and right actuator assemblies 350*l*, 350*r*. The left actuator assembly 350*l* is received and extends in the rear left pillar 72*l*. The left actuator assembly 350*l* has a lower end (not shown) connected to the rear left pillar 72*l*. The right actuator assembly 350*r* is received and extends in the rear right pillar 72*r*. The right actuator assembly 350*r* has a lower end 351 connected to the rear right pillar 72*r*. The left and right actuator assemblies 350*l*, 350*r* are identical. Therefore, for simplicity, only the left actuator assembly 350*l* will be described.

The left actuator assembly 350*l* includes an extendible and retractable actuator 352 being operable for moving the door 110 in the open position when moved to an extended position (the right actuator assembly 350*r* is shown in the extended position in FIG. 7), and moving the door 110 in the closed position when moved to a retracted position. The actuator 352 has an upper end 354. The left actuator assembly 350*l* further includes an extension bracket 360 pivotally connected to the upper end 354 of the actuator 352. The extension bracket 360 is also connected to the extension arm 320 via fasteners 362. The extension bracket 360 extends through the aperture 314 defined in the plate 312, and the base 80*l*.

When a user operates the left and right actuator assemblies 350*l*, 350*r* so as to extend the actuators 352, the extension brackets 360 and the extension arms 320 are moved upwardly, the door brackets 280*l*, 280*r* abut the abutment portion 340 of the corresponding extension arm 320, and the door 110 pivots from the closed position to the open position about the pivot axis 270. When the door 110 is in the open position and when a user operates the left and right actuator assemblies 350*l*, 350*r* so as to retract the actuators 352, the extension brackets 360 and the extension arms 320 are moved downwardly, the door brackets 280*l*, 280*r* remain in abutment with the abutment portion 340 of the corresponding extension arm 320, and the door 110 pivots from the open position to the closed position about the pivot axis 270.

The hinge assembly 200*b* has the following advantages, among others, over the hinge assembly 200*a*. First, the door 110 can be moved in the open position without moving the vehicle container 40 in the raised position. Second, larger items can be emptied from the vehicle container 40 since the door 110 opens higher than using the hinge assembly 200*a*, as seen in FIGS. 3 and 7. Third, if a user desires to empty the content of the vehicle container 40 by moving the vehicle container 40 in the raised position, the hinge assembly 200*b* enables the door 110 to pivot about both pivot axes 270, 333, or only the pivot axis 333, between the closed position and the open position.

Referring now to FIGS. 9 and 10, the hinge assembly 200*c* will be described in details. As mentioned above, the hinge assembly 200*c* provides for a swing-gate opening action of the door 110, as shown in FIG. 9. The hinge assembly 200*c*, like the hinge assemblies 200*a*, 200*b*, includes a left hinge assembly 202*l* and a right hinge assembly 202*r*. In the present embodiment, the left and right hinge assemblies 202*l*, 202*r* have components that are similar or the same as the ones described above with reference to the hinge assembly 200*a*. Therefore, for simplicity, elements of the hinge assembly 200*c* that are the same as or similar to those of the hinge assembly 200*a* have been labeled with the same reference numerals and will not be described again in detail.

Referring to FIG. 10, a plate 402 is present in both the left and right hinge assemblies 202*l*, 202*r*. The plates 402 are connected to the left and right bases 80*l*, 80*r* using the fasteners 216. When connected, the plates 402 also define the top faces 218*l*, 218*r* of the left and right rear pillars 72*l*, 72*r*. Each of the plates 402 also defines an aperture 404.

Similar to what has been described with reference to the left pillar bracket 230*l* of hinge assembly 200*a*, a right pillar bracket 230*r* is connected to the plate 402 and to the right base 80*r* using the fasteners 216. A hinge pin 260 extends through the right pillar bracket 230*r*. A right adjuster assembly 250*r* permits adjustment of the position of the right pillar bracket 230*r* relative to the plate 402 and base 80*r*. Although the right pillar bracket 230*r* shown in FIGS. 9 and 10 differs from the left pillar bracket 230*l* shown in FIGS. 4 and 8, it is contemplated that the right pillar bracket 230*r* of the hinge assembly 200*c* could be identical to the left pillar bracket 230*l* and the right pillar bracket 230*r* of the hinge assemblies 200*a*, 200*b*.

A right door bracket 280*r* is pivotally connected to the right pillar bracket 230*r* when the hinge pin 260 extends through the right pillar bracket 230*r* and the aperture 286 of the right door bracket 280*r*. The right door bracket 280*r* further has a pivot 410 having a pivot axis 412 extending perpendicular to the pivot axis 270. The pivot 410 is connected to the upper right door corner bracket 284*r*, in the upper right portion 112*r* of the door 110. In the lower right portion 114*r* of the door 110, the lower right door corner bracket 294*r* includes a bracket 420. A pin 422 is connected to the bracket 420, and a bushing 424 extends over the pin 422. The pin 422 defines an axis 426 that is coaxial with the pivot axis 412.

Still referring to FIGS. 9 and 10, a lower right pillar bracket 430 is connected to the rear right pillar 72*r* using fasteners (not shown). When connected, the lower right pillar bracket 430 is located below the right pillar bracket 230*r*. The lower right pillar bracket 430 has a U-shaped portion 432 dimensioned to receive the pin 422 and the bushing 424 therein, as shown in FIG. 9. When the pin 422 and the bushing 424 are received in the lower right pillar bracket 430, the door 110 is pivotable relative to the vehicle container 40 about the pivot axes 412, 426 in a swing-gate configuration.

The hinge assembly 200*c* further includes a left pillar bracket 450 that is connected to the plate 402 and to the left base 80*l* using the fasteners 216. In contrast with the left pillar bracket 230*l* described above, the left pillar bracket 450 is hook-shaped. As described above, the left adjuster assembly 250*l* and the slotted holes 234 defined in the flange 232 permit the adjustment of the position of the left pillar bracket 450 relative to the plate 402 and the base 80*l* in the lengthwise direction 52 of the vehicle container 40 before the fasteners 216 extending in the holes 234 are tightened.

The hinge assembly 200*c* further includes a left door bracket 280*l* that has a pin 460 in replacement of the aperture 286. The pin 460 is shaped and dimensioned to be received in the left pillar bracket 450. The hinge assembly 200*c* further includes a lock 470 for selectively locking the pin 460 to the left pillar bracket 450. The lock 470 extends through the aperture 404. The lock 470 is moveable using, for example, manual, pneumatic or hydraulic systems. When the lock 470 is moved in the locked position (i.e. upwardly), the lock 470 retains the pin 460 in the left pillar bracket 450. When the lock 470 is moved in the unlocked position (i.e. downwardly), the pin 460 is free to move away from the left pillar bracket 450, and thus allow the door 110 to pivot about the coaxial pivot axes 412, 426 in a swing-gate configuration.

It is to be noted that the door 110 can be moved from the closed position to the open position by having the lock 470 in the locked position, by unlocking the door latch system 150 and by pivoting the vehicle container 40 in the raised position, as indicated by line 24 in FIG. 1, such that the door 110 pivots about the pivot axis 270. Furthermore, although the embodiment illustrated in FIGS. 9 and 10 has the door 110 pivoting about the rear right pillar 72*r*, the left and right hinge assemblies 202*l*, 202*r* of the hinge assembly 200*c* could be flipped so as to make the door 110 pivot about the rear left pillar 72*l*.

Referring now to FIG. 11, a method 500 for changing a pivoting configuration of the door 110 of the vehicle container 40 will be described using the hinge assemblies 200*a*, 200*c* described above. As mentioned, the door 110 is pivotally connected to the top portions 82*l*, 82*r* of the pillars 72*l*, 72*r* when the hinge assemblies 200*a*, 200*b* are used, and to one of the top portions 82*l*, 82*r* when the hinge assembly 200*c* is used. In an illustrative scenario, the door 110 is initially pivotally connected to the vehicle container 40 via the hinge assembly 200*a*, and is thus movable in single-action opening. When the door 110 needs to be pivotally connected to the vehicle container 40 to be movable in a swing-gate configuration, a user first unfastens 510 the hinge assembly 200*a* from the door 110 and from the top portions 82*l*, 82*r* of the pillars 72*l*, 72*r*. The user then fastens 520 the hinge assembly 200*c* to the door 110 and to the top portions 82*l*, 82*r* of the pillars 72*l*, 72*r*. The user also connects the lower right door corner bracket 294*r* including the bracket 420 to the door 110, and connects the lower right pillar bracket 430 to the rear right pillar 72*r*. The user then pivotally connects 530 the door 110 to the vehicle container 40 using the hinge assembly 200*c*, and the door 110 is movable in a swing-gate configuration. In the above scenario, the method 500 involves no welding operations, and adjustments of the position of the door 110 relative to the vehicle container 40 can be performed using the adjuster assemblies 250*l*, 250*r* and the screw adjustment assemblies 290*l*, 290*r*.

The systems 100, 400, the vehicle container 40, and the door 110 for a vehicle container 40 implemented in accordance with some non-limiting implementations of the present technology can be represented as presented in the following numbered clauses.

CLAUSE 1: A system (100) for assembling a door (110) to a vehicle container (40), the vehicle container (40) having a container body (41*c*), a first pillar (72*l*) connected to the container body, and a second pillar (72*r*) connected to the container body, an opening (41*a*) providing access to an interior (41*b*) of the container body being defined between the first and second pillars, and the door selectively closing the opening, the system comprising a first base (80*l*) adapted for connection to a top portion (82*l*) of the first pillar, a second base (80*r*) adapted for connection to a top portion (82*r*) of the second pillar, and a hinge assembly (200) adapted for pivotally connecting the door to the vehicle container, the hinge assembly being adapted to be removably connected to the first and second bases and to the door, the hinge assembly being selected from a first hinge assembly (200*a*), and a second hinge assembly (200*b*), when the first hinge assembly pivotally connects the door to the vehicle container, the door has a first pivoting configuration and when the second hinge assembly pivotally connects the door to the vehicle container, the door has a second pivoting configuration being different from the first pivoting configuration.

CLAUSE 2: The system of clause 1, wherein the first hinge assembly comprises a first left hinge assembly (202*l*) having a first left adapter assembly (210*l*) adapted to be removably connected to the first base, a first left pillar bracket (230*l*) adapted to be removably connected to the first left adapter assembly, and a first left door bracket (280*l*) adapted to be removably connected to the door, and a first right hinge assembly (202*r*) having a first right adapter assembly adapted to be removably connected to the second base, a first right pillar bracket (230*r*) adapted to be removably connected to the first right adapter assembly, and a first right door bracket (280*r*) adapted to be removably connected to the door, and the second hinge assembly comprises a second left hinge assembly (202*l*) having a second left adapter assembly adapted to be removably connected to the first base, a second left pillar bracket (230*l*) adapted to be removably connected to the second left adapter assembly, and a second left door bracket (280*l*) adapted to be removably connected to the door, and a second right hinge assembly (202*r*) having a second right adapter assembly adapted to be removably connected to the second base, a second right pillar bracket (230*r*) adapted to be removably connected to the second right adapter assembly, and a second right door bracket (280*r*) adapted to be removably connected to the door, wherein the first left pillar bracket is identical to the second left pillar bracket, and the first right pillar bracket is identical to the second right pillar bracket.

CLAUSE 3: The system of clause 2, wherein the first left pillar bracket is identical to the first right pillar bracket.

CLAUSE 4: The system of clause 2 or 3, wherein the first left adapter assembly is identical to the first right adapter assembly, and the second left adapter assembly is identical to the second right adapter assembly.

CLAUSE 5: The system of any one of clauses 2 to 4, wherein the first left door bracket is identical to the second left door bracket, and the first right door bracket is identical to the second right door bracket.

CLAUSE 6: The system of any one of clauses 2 to 5, wherein, when in use, the first left pillar bracket and the second left pillar bracket are located at different positions relative to the first base, and, when in use, the first right pillar bracket and the second right pillar bracket are located at different positions relative to the second base.

CLAUSE 7: The system of any one of clauses 1 to 6, wherein the first hinge assembly is a single-action opening hinge assembly, the first left door bracket being pivotally connected to the first left pillar bracket, and the first right door bracket being pivotally connected to the first right pillar bracket.

CLAUSE 8: The system of any one of clauses 1 to 6, wherein the second hinge assembly is a high-lift gate opening hinge assembly further comprising a left extension arm (320) pivotally connected between the second left door bracket and the second left pillar bracket, a right extension arm (320) pivotally connected between the second right door bracket and the second right pillar bracket, and at least one actuator assembly (350*l*, 350*r*) having upper and lower ends (354, 351), the lower end being pivotally connected to one of the first and second pillars, the upper end being pivotally connected to one of the left and right extension arms, the actuator assembly including an extendible and retractable actuator (352) being operable for pivoting the door away from the first and second pillars when moved to an extended position, and pivoting the door towards the first and second pillars when moved to a retracted position.

CLAUSE 9: The system of any one of clauses 1 to 8, wherein the hinge assembly is selected from the first hinge assembly, the second hinge assembly and a third hinge assembly (200*c*) providing for a third pivoting configuration of the door relative to the vehicle container, the third pivoting configuration being different from the first and second pivoting configurations, the third hinge assembly comprising a third left hinge assembly (202*l*) having a third left adapter assembly (210*l*) adapted to be removably connected to the first base, a third left pillar bracket (450) adapted to be removably connected to the third left adapter assembly, and a third left door bracket (280*l*) adapted to be removably connected to the door, and a third right hinge assembly (202*r*) having a third right adapter assembly (210*r*) adapted to be removably connected to the second base, a third right pillar bracket (230*r*) adapted to be removably connected to the third right adapter assembly, and a third right door bracket (280*r*) adapted to be removably connected to the door, the third left pillar bracket is different from the third right pillar bracket, and the third left door bracket is different from the third right door bracket.

CLAUSE 10: The system of clause 9, wherein the third hinge assembly is a swing-gate opening hinge assembly, the third left pillar bracket is an upper left pillar bracket, the third right pillar bracket is an upper right pillar bracket, the third left door bracket is an upper left door bracket, the third right door bracket is an upper right door bracket, the third hinge assembly further comprises at least one of a lower left pillar bracket adapted to be removably connected to the first pillar below the upper left pillar bracket, and a lower right pillar bracket (430) adapted to be removably connected to the second pillar below the upper right pillar bracket, and the door is pivotally connected to the vehicle container via at least one of the upper left pillar bracket and the lower left pillar bracket, and the upper right pillar bracket and the lower right pillar bracket.

CLAUSE 11: The system of clause 9 or 10, wherein, when in use, any one of the first, second and third left adapter assemblies defines at least partially a top face (218*l*) of the first pillar, and, when in use, any one of the first, second and third right adapter assemblies defines at least partially a top face (218*r*) of the second pillar.

CLAUSE 12: The system of any one of clauses 9 to 11, further comprising a left adjuster assembly (250*l*) for adjusting a position of any one of the first, second and third left pillar bracket relative to the corresponding first, second or third left adapter assembly, and a right adjuster assembly (250*r*) for adjusting a position of any one of the first, second and third right pillar bracket relative to the corresponding first, second or third right adapter assembly.

CLAUSE 13: The system of clause 12, wherein the left adjuster assembly adjusts the position of any one of the first, second and third left pillar bracket relative to the corresponding first, second or third left adapter assembly in a lengthwise direction (52) of the vehicle container, and the right adjuster assembly adjusts a position of any one of the first, second and third right pillar bracket relative to the corresponding first, second or third right adapter assembly in the lengthwise direction of the vehicle container.

CLAUSE 14: The system of any one of clauses 9 to 13, further comprising at least one adjustment screw assembly (290*l*, 290*r*) connected to the door for adjusting a position of the door relative to the vehicle container.

CLAUSE 15: The system of any one of clauses 1 to 14, wherein the first base is a left base, the first pillar is a left pillar, the second base is a right base, the second pillar is a right pillar, and the container body includes a floor (42), a front wall (60) connected to a front end (44) of the floor and extending upwardly from the floor, a left side wall (70*l*) connected to the floor and the front wall, the left side wall extending upwardly from a left side (48) of the floor and rearward of the front wall, the left pillar being connected to the left side wall and to a rear end (46) of the floor, the left pillar extending upwardly from the rear end of the floor and rearward of the left side wall, and a right side wall (70*r*) connected to the floor and the front wall, the right side wall extending upwardly from a right side (50) of the floor and rearward of the front wall, the right pillar being connected to the right side wall and to the rear end of the floor, the right pillar extending upwardly from the rear end of the floor and rearward of the right side wall.

CLAUSE 16: The system of any one of clauses 1 to 15, wherein the vehicle container is a dump body for a truck (10).

CLAUSE 17: The system of clause 16, wherein the door is a tailgate plate.

CLAUSE 18: A system (400) for assembling a family of vehicle containers, the system comprising a vehicle container (40) having a container body (41*c*), a first pillar (72*l*) connected to the container body, a first base (80*l*) connected to a top portion (82*l*) of the first pillar, a second pillar (72*r*) connected to the container body, and a second base (80*r*) connected to a top portion (82*r*) of the second pillar, a door assembly (102) for selectively closing an opening (41*a*) defined between the first and second pillars, the opening providing access to an interior (41*b*) of the vehicle container, the door assembly including a door (110), and a hinge assembly (200) adapted for pivotally connecting the door to the vehicle container, the hinge assembly being adapted to be removably connected to the first and second bases and to the door, the hinge assembly being selected from a first hinge assembly (200*a*), and a second hinge assembly (200*b*), when the first hinge assembly pivotally connects the door to the vehicle container, the door has a first pivoting configuration and when the second hinge assembly pivotally connects the door to the vehicle container, the door has a second pivoting configuration being different from the first pivoting configuration.

CLAUSE 19: A vehicle container assembled according to the system of clause 18.

CLAUSE 20: A truck (10) comprising a frame (12), a cab (14) connected to the frame, a plurality of wheels (16, 18) rotatably connected to the frame, and the vehicle container of clause 19 connected to the frame.

CLAUSE 21: A method for changing a pivoting configuration of a door (110) pivotally connected to a top portion (82*l*, 82*r*) of a pillar (72*l*, 72*r*) of a vehicle container (40) via a first hinge assembly (200*a*), the method comprising unfastening the first hinge assembly from at least one of the door and the top portion of the pillar of the vehicle container, fastening a second hinge assembly (202*b*, 202*c*) to the at least one of the door and the top portion of the pillar of the vehicle container, and pivotally connecting the door to the vehicle container using the second hinge assembly, the second hinge assembly providing a pivoting configuration of the door that is different from the pivoting configuration provided by the first hinge assembly.

CLAUSE 22: A door (110) for a vehicle container (40) comprising a panel (111) having left and right bent portions (116*l*, 116*r*), and a lower bent portion (120), the panel defining holes (117, 295*a*) in the left and right bent portions and in the lower bent portion for receiving fasteners (282, 295), and a portion of a hinge assembly (200) removably connected to the panel by the fasteners.

CLAUSE 23: The door of clause 22, wherein the portion of a hinge assembly includes at least one of a left lower bracket (294*l*) removably fastened to the left bent portion and to the lower bent portion, and a right lower bracket (294*r*) removably fastened to the right bent portion and to the lower bent portion.

CLAUSE 24: The door of clause 23, wherein the at least one of the left lower bracket and the right lower bracket includes an adjustment screw assembly (290*l*, 290*r*) for adjusting a position of the door relative to the vehicle container.

CLAUSE 25: The door of any one of clauses 22 to 24, wherein the panel further comprises an upper bent portion (118), and wherein the portion of a hinge assembly further includes a left upper bracket (280*l*) removably fastened to the left bent portion and to the upper bent portion, and a right upper bracket (280*r*) removably fastened to the right bent portion and to the upper bent portion.

CLAUSE 26: A vehicle container (40) comprising a vehicle container body (41*c*), a door (110) pivotally connected the vehicle container body, and a screw adjustment assembly (290*l*, 290*r*) removably connected to the door for adjusting a position of the door relative to the vehicle container body.

CLAUSE 27: The vehicle container of clause 26, further comprising a door latch system (150) for locking the door to the vehicle container body when the door is in a closed position, the door latch system including an extendible and retractable actuator (152) pivotally connected to the vehicle container body, a linkage assembly (160) operatively connected to the actuator, a rod (166) operatively connected to the linkage assembly, the rod being pivotable about an axis (170) upon extension and retraction of the actuator, and a hook (168) connected to the rod, the hook being moved between a locked position and an unlocked position by pivoting the rod about the axis, and the screw adjustment assembly includes a pin (172) removably fastened to the door, the pin being movable relative to the door and catchable by the hook.

CLAUSE 28: The vehicle container of clause 27, wherein the pin is threadably connected to the door.

CLAUSE 29: The vehicle container of any one of clauses 26 to 28, wherein the screw adjustment assembly includes an adjustment screw (292) connected to the pin, and a cap (296), the cap having a projection (296a) for preventing a rotation of the adjustment screw.

CLAUSE 30: The vehicle container of any one of clauses 26 to 28, wherein the hook has a tapered shape.

CLAUSE 31: The vehicle container of clause 30, wherein the screw adjustment assembly cooperates with the hook to adjust the position of the door relative to the vehicle container body in a heightwise direction (56).

CLAUSE 32: The vehicle container of any one of clauses 26 to 31, wherein the screw adjustment assembly is accessible from a rear side of the door.

CLAUSE 33: The vehicle container of any one of clauses 26 to 32, wherein the screw adjustment assembly adjusts the position of the door relative to the vehicle container in a lengthwise direction (52).

CLAUSE 34: A vehicle container (40) comprising a vehicle container body (41c) defining an opening (41a), a door (110) pivotally connected to the vehicle container body and selectively closing the opening when pivoted in a closed position, the door defining at least one recess (174), and a door latch system (150) for locking the door to the vehicle container body in the closed position, the door latch system including an extendible and retractable actuator (152) pivotally connected to the vehicle container body, a linkage assembly (160) operatively connected to the actuator, a rod (166) operatively connected to the linkage assembly, the rod being pivotable about an axis (170) upon extension and retraction of the actuator, at least one hook (168) connected to the rod, the at least one hook being received and withdrawn from the at least one recess of the door by pivoting the rod about the axis, and at least one pin (172) removably fastened to the door and extending in the at least one recess, the at least one pin being selectively movable relative to the door.

CLAUSE 35: The vehicle container of clause 34, wherein the at least one pin is threadably connected to the door.

CLAUSE 36: The vehicle container of clause 34 or 35, wherein the linkage assembly includes a base (164a) connected to the vehicle container body, a first link (164b) pivotally connected to the base by a first pivot axis (162a), a second link (164c) pivotally connected to the first link by a second pivot axis (162b), and a rod link (164d) pivotally connected to the second link by a third pivot axis (162c), and the rod link being further connected to the rod.

CLAUSE 37: The vehicle container of clause 36, wherein, when the at least one hook is in an unlocked position, the second pivot axis is on a first side of an imaginary line (162d) passing through the first and third pivot axes, and when the at least one hook is in a locked position, the second pivot axis is on a second side of the imaginary line, the second side being opposite the first side.

CLAUSE 38: The vehicle container of any one of clauses 34 to 37, wherein the at least one hook has a tapered shape.

CLAUSE 39: The vehicle container of any one of clauses 34 or 38, further comprising a stop (168a) connected to the at least one hook, the stop being structured to abut the vehicle container body when the at least one hook is fully withdrawn from the at least one recess of the door.

Modifications and improvements to the above-described embodiments of the present technology may become apparent to those skilled in the art. The foregoing description is intended to be exemplary rather than limiting. The scope of the present technology is therefore intended to be limited solely by the scope of the appended claims.

What is claimed is:

1. A system for assembling a door to a vehicle container, the vehicle container having
    a container body, a first pillar connected to the container body, and a second pillar connected to the container body,
    an opening providing access to an interior of the container body being defined between the first and second pillars, and the door selectively closing the opening, the system comprising:
    a first base adapted for connection to a top portion of the first pillar;
    a second base adapted for connection to a top portion of the second pillar; and
    a hinge assembly adapted for pivotally connecting the door to the vehicle container, the hinge assembly being adapted to be removably connected to the first and second bases and to the door, the hinge assembly being selected from:
    a first hinge assembly, and
    a second hinge assembly,
    when the first hinge assembly pivotally connects the door to the vehicle container, the door has a first pivoting configuration and when the second hinge assembly pivotally connects the door to the vehicle container, the door has a second pivoting configuration being different from the first pivoting configuration.

2. The system of claim 1, wherein:
the first hinge assembly comprises:
    a first left hinge assembly having:
        a first left adapter assembly adapted to be removably connected to the first base,
        a first left pillar bracket adapted to be removably connected to the first left adapter assembly, and
        a first left door bracket adapted to be removably connected to the door; and
    a first right hinge assembly having:
        a first right adapter assembly adapted to be removably connected to the second base,
        a first right pillar bracket adapted to be removably connected to the first right adapter assembly, and
        a first right door bracket adapted to be removably connected to the door; and
the second hinge assembly comprises:
    a second left hinge assembly having:
        a second left adapter assembly adapted to be removably connected to the first base,
        a second left pillar bracket adapted to be removably connected to the second left adapter assembly, and
        a second left door bracket adapted to be removably connected to the door; and a second right hinge assembly having:
　a second right adapter assembly adapted to be removably connected to the second base,
　a second right pillar bracket adapted to be removably connected to the second right adapter assembly, and
　a second right door bracket adapted to be removably connected to the door;
wherein the first left pillar bracket is identical to the second left pillar bracket, and the first right pillar bracket is identical to the second right pillar bracket.

3. The system of claim 2, wherein the first left pillar bracket is identical to the first right pillar bracket.

4. The system of claim 2, wherein the first left adapter assembly is identical to the first right adapter assembly, and the second left adapter assembly is identical to the second right adapter assembly.

5. The system of claim 2, wherein the first left door bracket is identical to the second left door bracket, and the first right door bracket is identical to the second right door bracket.

6. The system of claim 2, wherein, when in use, the first left pillar bracket and the second left pillar bracket are located at different positions relative to the first base, and, when in use, the first right pillar bracket and the second right pillar bracket are located at different positions relative to the second base.

7. The system of claim 1, wherein the first hinge assembly is a single-action opening hinge assembly, the first left door bracket being pivotally connected to the first left pillar bracket, and the first right door bracket being pivotally connected to the first right pillar bracket.

8. The system of claim 1, wherein the second hinge assembly is a high-lift gate opening hinge assembly further comprising:
　a left extension arm pivotally connected between the second left door bracket and the second left pillar bracket;
　a right extension arm pivotally connected between the second right door bracket and the second right pillar bracket; and
　at least one actuator assembly having upper and lower ends, the lower end being pivotally connected to one of the first and second pillars, the upper end being pivotally connected to one of the left and right extension arms, the actuator assembly including an extendible and retractable actuator being operable for pivoting the door away from the first and second pillars when moved to an extended position, and pivoting the door towards the first and second pillars when moved to a retracted position.

9. The system of claim 1, wherein the hinge assembly is selected from the first hinge assembly, the second hinge assembly and a third hinge assembly providing for a third pivoting configuration of the door relative to the vehicle container, the third pivoting configuration being different from the first and second pivoting configurations, the third hinge assembly comprising:
　a third left hinge assembly having:
　　a third left adapter assembly adapted to be removably connected to the first base,
　　a third left pillar bracket adapted to be removably connected to the third left adapter assembly, and
　　a third left door bracket adapted to be removably connected to the door; and
　a third right hinge assembly having:
　　a third right adapter assembly adapted to be removably connected to the second base,
　　a third right pillar bracket adapted to be removably connected to the third right adapter assembly, and
　　a third right door bracket adapted to be removably connected to the door;
the third left pillar bracket is different from the third right pillar bracket, and the third left door bracket is different from the third right door bracket.

10. The system of claim 9, wherein:
the third hinge assembly is a swing-gate opening hinge assembly,
the third left pillar bracket is an upper left pillar bracket,
the third right pillar bracket is an upper right pillar bracket,
the third left door bracket is an upper left door bracket,
the third right door bracket is an upper right door bracket,
the third hinge assembly further comprises at least one of:
　a lower left pillar bracket adapted to be removably connected to the first pillar below the upper left pillar bracket, and
　a lower right pillar bracket adapted to be removably connected to the second pillar below the upper right pillar bracket; and
the door is pivotally connected to the vehicle container via at least one of:
　the upper left pillar bracket and the lower left pillar bracket, and
　the upper right pillar bracket and the lower right pillar bracket.

11. The system of claim 9, wherein, when in use, any one of the first, second and third left adapter assemblies defines at least partially a top face of the first pillar, and, when in use, any one of the first, second and third right adapter assemblies defines at least partially a top face of the second pillar.

12. The system of claim 9, further comprising a left adjuster assembly for adjusting a position of any one of the first, second and third left pillar bracket relative to the corresponding first, second or third left adapter assembly, and a right adjuster assembly for adjusting a position of any one of the first, second and third right pillar bracket relative to the corresponding first, second or third right adapter assembly.

13. The system of claim 12, wherein the left adjuster assembly adjusts the position of any one of the first, second and third left pillar bracket relative to the corresponding first, second or third left adapter assembly in a lengthwise direction of the vehicle container, and the right adjuster assembly adjusts a position of any one of the first, second and third right pillar bracket relative to the corresponding first, second or third right adapter assembly in the lengthwise direction of the vehicle container.

14. The system of claim 9, further comprising at least one adjustment screw assembly connected to the door for adjusting a position of the door relative to the vehicle container.

15. The system of claim 1, wherein:
the first base is a left base;
the first pillar is a left pillar;
the second base is a right base;
the second pillar is a right pillar, and
the container body includes:
　a floor,
　a front wall connected to a front end of the floor and extending upwardly from the floor,
　a left side wall connected to the floor and the front wall, the left side wall extending upwardly from a left side of the floor and rearward of the front wall, the left pillar being connected to the left side wall and to a rear end of the floor, the left pillar extending upwardly from the rear end of the floor and rearward of the left side wall, and a right side wall connected to the floor and the front wall, the right side wall extending upwardly from a right side of the floor and rearward of the front wall, the right pillar being connected to the right side wall and to the rear end of the floor, the right pillar extending upwardly from the rear end of the floor and rearward of the right side wall.

16. The system of claim 1, wherein the vehicle container is a dump body for a truck.

17. The system of claim 16, wherein the door is a tailgate plate.

18. A system for assembling a family of vehicle containers, the system comprising:
   a vehicle container having
      a container body;
      a first pillar connected to the container body,
      a first base connected to a top portion of the first pillar,
      a second pillar connected to the container body, and
      a second base connected to a top portion of the second pillar,
   a door assembly for selectively closing an opening defined between the first and second pillars, the opening providing access to an interior of the vehicle container, the door assembly including
      a door, and
      a hinge assembly adapted for pivotally connecting the door to the vehicle container, the hinge assembly being adapted to be removably connected to the first and second bases and to the door, the hinge assembly being selected from:
         a first hinge assembly, and
         a second hinge assembly,
         when the first hinge assembly pivotally connects the door to the vehicle container, the door has a first pivoting configuration and when the second hinge assembly pivotally connects the door to the vehicle container, the door has a second pivoting configuration being different from the first pivoting configuration.

19. A vehicle container assembled according to the system of claim 18.

20. A truck comprising:
   a frame;
   a cab connected to the frame;
   a plurality of wheels rotatably connected to the frame; and
   the vehicle container of claim 19 connected to the frame.

21. A method for changing a pivoting configuration of a door pivotally connected to a top portion of a pillar of a vehicle container via a first hinge assembly, the method comprising:
   unfastening the first hinge assembly from at least one of the door and the top portion of the pillar of the vehicle container,
   fastening a second hinge assembly to the at least one of the door and the top portion of the pillar of the vehicle container, and
   pivotally connecting the door to the vehicle container using the second hinge assembly, the second hinge assembly providing a pivoting configuration of the door that is different from the pivoting configuration provided by the first hinge assembly.

22. A door for a vehicle container comprising:
   a panel having left and right bent portions, and a lower bent portion, the panel defining holes in the left and right bent portions and in the lower bent portion for receiving fasteners; and
   a portion of a hinge assembly removably connected to the panel by the fasteners.

23. The door of claim 22, wherein the portion of a hinge assembly includes at least one of:
   a left lower bracket removably fastened to the left bent portion and to the lower bent portion; and
   a right lower bracket removably fastened to the right bent portion and to the lower bent portion.

24. The door of claim 23, wherein the at least one of the left lower bracket and the right lower bracket includes an adjustment screw assembly for adjusting a position of the door relative to the vehicle container.

25. The door of claim 22, wherein the panel further comprises an upper bent portion, and wherein the portion of a hinge assembly further includes:
   a left upper bracket removably fastened to the left bent portion and to the upper bent portion, and
   a right upper bracket removably fastened to the right bent portion and to the upper bent portion.

* * * * *